United States Patent
Folick et al.

(10) Patent No.: US 11,094,950 B2
(45) Date of Patent: *Aug. 17, 2021

(54) EQUATION BASED STATE ESTIMATOR FOR COOLING SYSTEM CONTROLLER

(71) Applicant: Toyota Motor Engineering & Manufacturing North America, Inc., Erlanger, KY (US)

(72) Inventors: Daniel Folick, Long Beach, CA (US); Jared Farnsworth, Roseville, CA (US); Shigeki Hasegawa, Aichi (JP); Kentaro Fukuda, Aichi (JP)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 571 days.

This patent is subject to a terminal disclaimer.

(21) Appl. No.: 15/824,986

(22) Filed: Nov. 28, 2017

(65) Prior Publication Data
US 2019/0165395 A1    May 30, 2019

(51) Int. Cl.
*H01M 8/04701* (2016.01)
*H01M 8/04029* (2016.01)
*H01M 8/0432* (2016.01)
*H01M 8/04119* (2016.01)
*H01M 8/04014* (2016.01)
*H01M 8/04007* (2016.01)
*H01M 8/04082* (2016.01)
(Continued)

(52) U.S. Cl.
CPC ... *H01M 8/04723* (2013.01); *H01M 8/04014* (2013.01); *H01M 8/04029* (2013.01); *H01M 8/04067* (2013.01); *H01M 8/04134* (2013.01); *H01M 8/04201* (2013.01); *H01M 8/04358* (2013.01); *H01M 8/04268* (2013.01); *H01M 8/04955* (2013.01); *H01M 2008/1095* (2013.01)

(58) Field of Classification Search
None
See application file for complete search history.

(56) References Cited

U.S. PATENT DOCUMENTS 5,991,670 A    11/1999  Mufford et al.
6,186,254 B1   2/2001   Mufford et al.
(Continued)

FOREIGN PATENT DOCUMENTS

JP      2011216446      10/2011
WO   WO2012/127348     9/2012

*Primary Examiner* — Ula C Ruddock
*Assistant Examiner* — Anna Korovina
(74) *Attorney, Agent, or Firm* — Snell & Wilmer L.L.P.

(57) ABSTRACT

A system includes a fuel cell stack that receives a fluid, an actuator to increase or decrease a fluid temperature of the fluid, a pipe to facilitate flow of the fluid, and a memory designed to store a model of the fuel cell circuit. The system also includes an ECU that calculates mass flow values of the fluid through the fuel cell stack or the pipe based on a previously-determined mass flow value and the model of the fuel cell circuit. The ECU also calculates a plurality of pressure values corresponding to the fuel cell stack or the pipe based on the plurality of mass flow values and the model, controls the actuator position of the actuator to increase or decrease the fluid temperature based on at least one of the plurality of mass flow values and at least one of the plurality of pressure values.

7 Claims, 20 Drawing Sheets

(51) Int. Cl.
*H01M 8/04955* (2016.01)
*H01M 8/04223* (2016.01)
*H01M 8/1018* (2016.01)

(56) References Cited

U.S. PATENT DOCUMENTS

| | | |
|---|---|---|
| 6,428,444 B1 | 8/2002 | Tabata |
| 6,436,561 B1 | 8/2002 | Hart-Predmore et al. |
| 6,582,841 B2 | 6/2003 | Okamoto et al. |
| 6,584,789 B2 | 7/2003 | Ishikawa |
| 6,651,761 B1 | 11/2003 | Hrovat et al. |
| 6,824,903 B2 | 11/2004 | Shimada et al. |
| 6,855,444 B2 | 2/2005 | Morishima et al. |
| 7,086,492 B2 | 8/2006 | Kawasaki et al. |
| 7,271,567 B2 | 9/2007 | Dunn et al. |
| 7,517,599 B2 | 4/2009 | Shige et al. |
| 7,785,724 B2 | 8/2010 | Bencherif et al. |
| 8,047,319 B2 | 11/2011 | Maier |
| 8,129,061 B2 | 3/2012 | Fujita |
| 8,215,381 B2 | 7/2012 | Schwartz et al. |
| 8,257,874 B2 | 9/2012 | Yamaga et al. |
| 8,288,049 B2 | 10/2012 | Wheat et al. |
| 8,343,676 B2 | 1/2013 | Aoyagi et al. |
| 8,485,226 B2 | 7/2013 | Na |
| 8,518,590 B2 | 8/2013 | Sugiura et al. |
| 8,546,035 B2 | 10/2013 | Katano |
| 8,580,447 B2 | 11/2013 | Matsusue et al. |
| 8,642,224 B2 | 2/2014 | Umayahara |
| 8,718,868 B2 | 5/2014 | Petrucci et al. |
| 8,808,937 B2 | 8/2014 | Takemoto et al. |
| 8,839,665 B2 | 9/2014 | Nishigaki |
| 8,846,259 B2 | 9/2014 | Shimoda et al. |
| 8,868,314 B2 | 10/2014 | Morita et al. |
| 8,926,720 B2 | 1/2015 | Li |
| 8,951,685 B2 | 2/2015 | Aso et al. |
| 8,956,778 B2 | 2/2015 | Zhang et al. |
| 8,965,608 B2 | 2/2015 | Yoshida et al. |
| 9,196,915 B2 | 11/2015 | Kawahara et al. |
| 9,312,549 B2 | 4/2016 | Tachibana et al. |
| 9,349,934 B2 | 5/2016 | Gille et al. |
| 9,552,678 B2 | 1/2017 | Meyer et al. |
| 9,566,853 B2 | 2/2017 | Hayashi et al. |
| 2006/0240298 A1* | 10/2006 | Yamada ............ H01M 8/04044 429/440 |
| 2010/0003563 A1* | 1/2010 | Kimata ............ H01M 8/04007 429/412 |
| 2010/0112387 A1 | 5/2010 | Nagasawa |
| 2012/0015268 A1 | 1/2012 | Yoshida et al. |
| 2012/0129066 A1 | 5/2012 | Ben-Aicha et al. |
| 2014/0120440 A1 | 5/2014 | Nolan et al. |
| 2014/0335432 A1 | 11/2014 | Sinha et al. |
| 2015/0046012 A1 | 2/2015 | Chen et al. |
| 2015/0288014 A1 | 10/2015 | Na et al. |
| 2016/0133966 A1 | 5/2016 | Komiya et al. |
| 2016/0141666 A1 | 5/2016 | Shim et al. |
| 2016/0141679 A1 | 5/2016 | Yamada et al. |
| 2016/0172693 A1 | 6/2016 | Lee et al. |
| 2016/0308228 A1* | 10/2016 | Takahashi ......... H01M 8/04753 |
| 2016/0372768 A1 | 12/2016 | Procter et al. |
| 2017/0012310 A1 | 1/2017 | Han et al. |
| 2017/0062846 A1 | 3/2017 | Kim et al. |
| 2017/0069920 A1 | 3/2017 | Sakakibara |

* cited by examiner

EQUATION BASED STATE ESTIMATOR FOR COOLING SYSTEM CONTROLLER

BACKGROUND

1. Field

The present disclosure relates to systems and methods for controlling a temperature of a fluid that flows through a fuel cell stack of a fuel cell circuit based on feedforward and feedback control of multiple actuators of the fuel cell circuit.

2. Description of the Related Art

As the push for conservation of natural resources and reduced pollution advances, various concepts have been discovered to achieve such goals. These concepts range from harvesting wind and sun-based energy to various improvements in vehicle design. The vehicle improvements include new engines designed to improve fuel economy, hybrid vehicles that operate using a combination of an engine and a motor-generator to further improve fuel economy, fully electric vehicles that operate based on power stored in a battery, and fuel cell vehicles that generate electricity by facilitating a chemical reaction.

Many fuel cell vehicles include a fuel cell stack that includes multiple fuel cells. The fuel cells may receive a fuel, which typically includes hydrogen, along with oxygen or another oxidizing agent. The fuel cell stack may facilitate a chemical reaction between the hydrogen and oxygen. This chemical reaction generates electricity and water as a byproduct. The electricity generated by the fuel cell stack may be stored in a battery or directly provided to a motor-generator to generate mechanical power to propel the vehicle. While fuel cell vehicles are an exciting advance in the automobile industry, the technology is relatively new, providing space for improvements to the technology.

It is desirable for fuel cells to operate within a predetermined temperature range. If the temperature is too low then the power output by the fuel cells may likewise be relatively low. If the temperature is too high then the fuel cells may dry out, damaging or destroying the fuel cells.

Thus, there is a need in the art for systems and methods for accurately controlling a temperature of a fuel cell stack use in a vehicle.

SUMMARY

Described herein is a system for heating or cooling a fuel cell circuit of a vehicle. The system includes a fuel cell stack having a plurality of fuel cells and designed to receive a fluid and to heat the fluid. The system further includes an actuator having an actuator position and designed to increase or decrease a fluid temperature of the fluid. The system further includes a pipe designed to facilitate flow of the fluid through the fuel cell circuit. The system also includes a memory designed to store a model of the fuel cell circuit. The system also includes an electronic control unit (ECU) coupled to the actuator and the memory. The ECU is designed to calculate a plurality of mass flow values of the fluid each corresponding to a mass flow of the fluid through the fuel cell stack or the pipe based on a previously-determined mass flow value and the model of the fuel cell circuit. The ECU is also designed to calculate a plurality of pressure values each corresponding to a pressure of the fluid at an inlet or an outlet of the fuel cell stack or the pipe based on the plurality of mass flow values and the model of the fuel cell circuit. The ECU is also designed to control the actuator position of the actuator to increase or decrease the fluid temperature based on at least one of the plurality of mass flow values and at least one of the plurality of pressure values.

Also described is a system for heating or cooling a fuel cell circuit of a vehicle. The system includes a fuel cell stack having a plurality of fuel cells and designed to receive a fluid and to heat the fluid. The system also includes a pump designed to pump the fluid through the fuel cell circuit at a pump speed. The system also includes a pipe designed to facilitate flow of the fluid through the fuel cell circuit. The system also includes a memory designed to store a model of the fuel cell circuit. The system also includes an electronic control unit (ECU) coupled to the pump and the memory. The ECU is designed to calculate a plurality of mass flow values of the fluid each corresponding to a mass flow of the fluid through the fuel cell stack, the pump, or the pipe based on a previously-determined mass flow value and the model of the fuel cell circuit. The ECU is also designed to calculate a plurality of pressure values each corresponding to a pressure of the fluid at an inlet or an outlet of the fuel cell stack, the pump, or the pipe based on the plurality of mass flow values and the model of the fuel cell circuit. The ECU is also designed to control the pump to increase or decrease the pump speed based on at least one of the plurality of mass flow values and at least one of the plurality of pressure values.

Also described is a method for heating or cooling a fuel cell circuit of a vehicle. The method includes storing, in a memory, a model of the fuel cell circuit. The method further includes determining, by the ECU, a temperature control signal corresponding to a desired temperature of a fluid within the fuel cell circuit at a fuel cell inlet or a fuel cell outlet of a fuel cell stack of the fuel cell circuit. The method further includes calculating, by an electronic control unit (ECU), a plurality of temperature values each corresponding to a fluid temperature of fluid at an outlet of a component of the fuel cell circuit based on a previously-determined temperature value at the outlet, a previously-determined heat transfer value corresponding to heat transfer of the component, and the model of the fuel cell circuit. The method further includes controlling, by the ECU, an actuator position of an actuator to increase or decrease the desired temperature based on the plurality of temperature values and the temperature control signal.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for heating and cooling fuel cells of a fuel cell circuit. In particular, the present disclosure describes systems and methods for estimating a current or recent state of the fuel cell circuit based on various features. The systems provide multiple advantages such as providing near real-time (i.e., within a single discrete time period) estimates of values for each component of the fuel cell circuit, which provides relatively high accuracy of the estimates. Estimating the values for the components also beneficially reduces costs of building the fuel cell circuit because the estimates reduce the quantity of sensors required to provide accurate results. The systems also advantageously allow for real-time adjustments to the estimates such that errors can be corrected relatively quickly rather than propagate through the model.

An exemplary system includes multiple components including a fuel cell stack, pipes, a pump, an intercooler, a radiator, and a three-way valve. The system further includes an actuator (which may include the pump and the three-way valve) that can increase or decrease a fluid temperature of a fluid within the system. The system includes a memory that stores a model of the fuel cell circuit including each of the components and the pipes. The system also includes an electronic control unit (ECU). The ECU can estimate various parameters of the system including mass flow rates, temperature values, pressure values, and so forth. The estimates are based on readings from two temperature sensors as well as current commanded actuator positions. The ECU can then control the actuators based on the estimated parameters.

Figure 1:
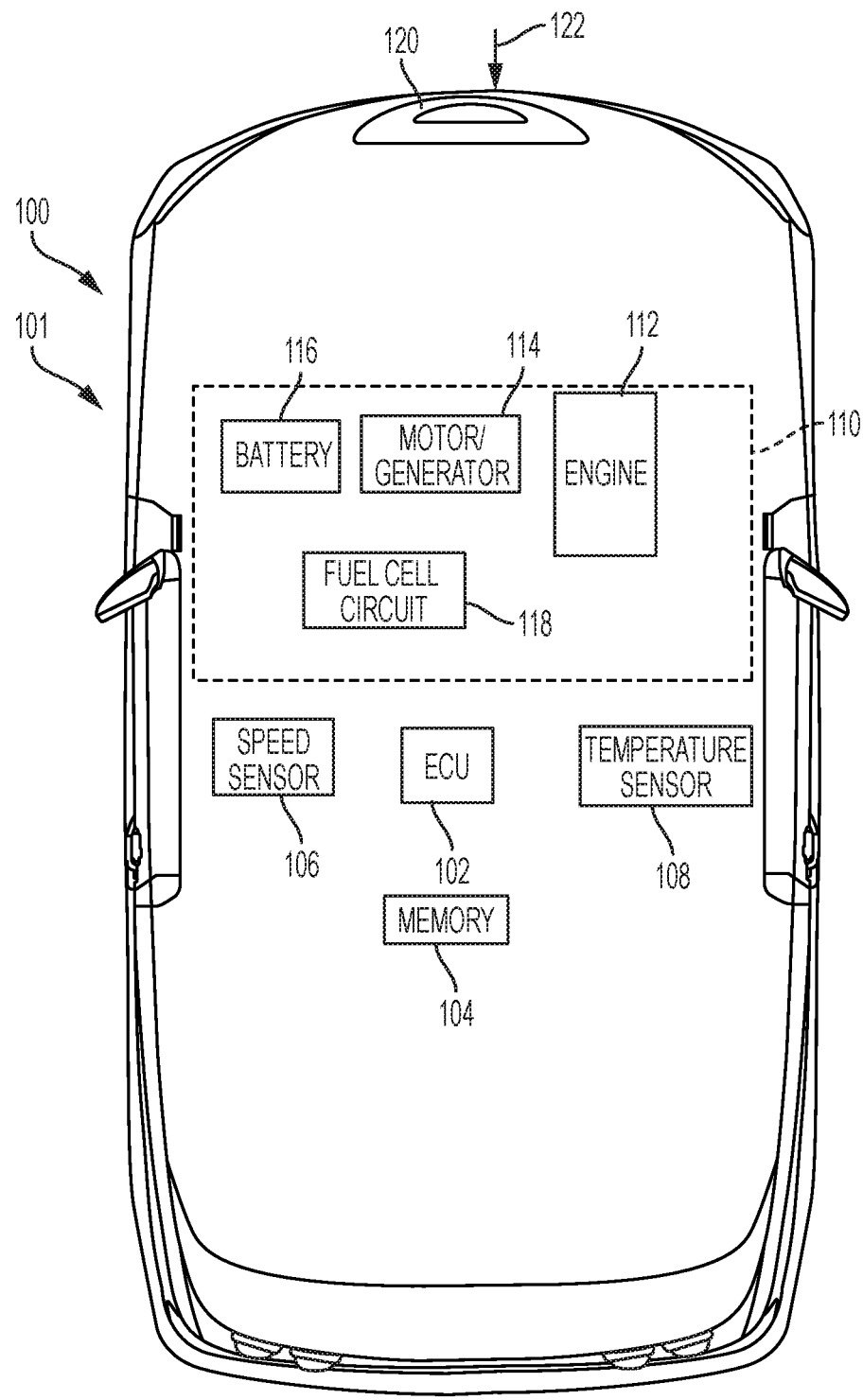
FIG. 1 is a block diagram illustrating various components of a vehicle having a fuel cell circuit capable of generating electricity based on a chemical reaction according to an embodiment of the present invention.

Turning to FIG. 1, a vehicle 100 includes components of a system 101 for controlling a temperature of fuel cells of the vehicle. In particular, the vehicle 100 and system 101 include an ECU 102, a memory 104, a speed sensor 106, and a temperature sensor 108. The vehicle 100 further includes a power source 110 which may include at least one of an engine 112, a motor-generator 114, a battery 116, or a fuel cell circuit 118.

The ECU 102 may be coupled to each of the components of the vehicle 100 and may include one or more processors or controllers, which may be specifically designed for automotive systems. The functions of the ECU 102 may be implemented in a single ECU or in multiple ECUs. The ECU 102 may receive data from components of the vehicle 100, may make determinations based on the received data, and may control the operation of components based on the determinations.

In some embodiments, the vehicle 100 may be fully autonomous or semi-autonomous. In that regard, the ECU 102 may control various aspects of the vehicle 100 (such as steering, braking, accelerating, or the like) to maneuver the vehicle 100 from a starting location to a destination.

The memory 104 may include any non-transitory memory known in the art. In that regard, the memory 104 may store machine-readable instructions usable by the ECU 102 and may store other data as requested by the ECU 102.

The speed sensor 106 may be any speed sensor capable of detecting data usable to determine a speed of the vehicle 100. For example, the speed sensor 128 may include a GPS sensor or an IMU sensor. The speed sensor 128 may also or instead include an angular velocity sensor configured to detect an angular velocity of the wheels of the vehicle 100 or the engine, a speedometer, or the like.

The temperature sensor 108 may include one or more temperature sensor capable of detecting data usable to determine an ambient temperature within a portion of the vehicle 100 or outside of the vehicle 100. For example, the temperature sensor 108 may include a thermocouple, a thermometer, an infrared temperature sensor, a thermistor, or the like.

The engine 112 may convert a fuel into mechanical power. In that regard, the engine 112 may be a gasoline engine, a diesel engine, or the like.

The battery 116 may store electrical energy. In some embodiments, the battery 116 may include any one or more energy storage device including a battery, a fly-wheel, a super-capacitor, a thermal storage device, or the like.

The fuel cell circuit 118 may include a plurality of fuel cells that facilitate a chemical reaction to generate electrical energy. In that regard, the electrical energy generated by the fuel cell circuit 118 may be stored in the battery 116. In some embodiments, the vehicle 100 may include multiple fuel cell circuits including the fuel cell circuit 118.

The motor-generator 114 may convert the electrical energy stored in the battery (or electrical energy received directly from the fuel cell circuit 118) into mechanical power usable to propel the vehicle 100. The motor-generator 114 may further convert mechanical power received from the engine 112 or wheels of the vehicle 100 into electricity, which may be stored in the battery 116 as energy and/or used by other components of the vehicle 100. In some embodiments, the motor-generator 114 may also or instead include a turbine or other device capable of generating thrust.

The body of the vehicle 100 may include a grill 120 located at a front of the vehicle. The grill 120 may receive an airflow 122. The speed of the airflow 122 may directly correspond to the speed of the vehicle 100. For example, if a headwind of 5 miles per hour (mph) exists outside of the vehicle 100 and the vehicle is traveling at 50 mph then the speed of the airflow 122 will be approximately 55 mph.

Figure 2:
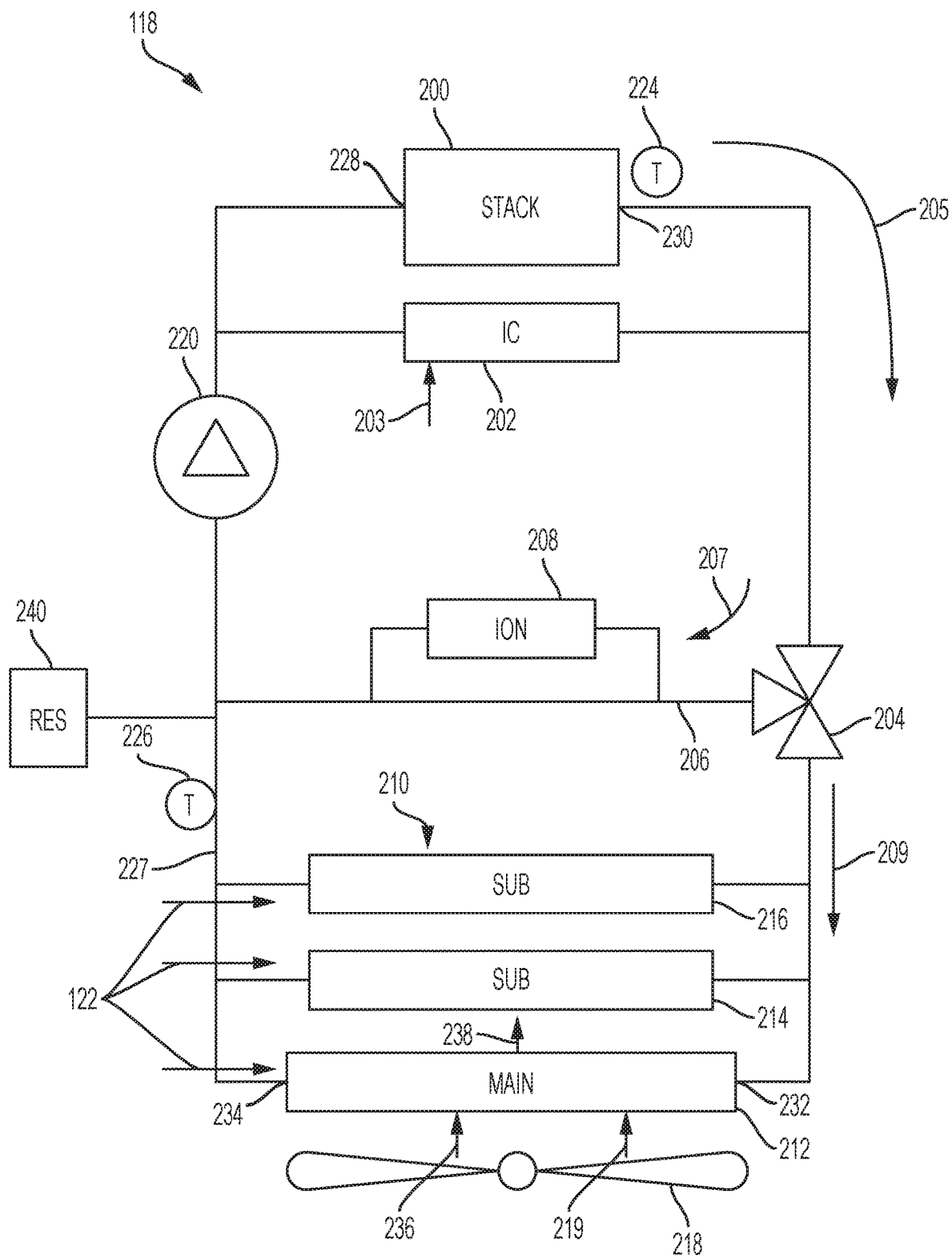
FIG. 2 is a block diagram illustrating various features of the fuel cell circuit of FIG. 1 according to an embodiment of the present invention.

Turning now to FIG. 2, additional details of the fuel cell circuit 118 are illustrated. The fuel cell circuit 118 includes a fuel cell stack 200 having a plurality of fuel cells. The fuel cells may each facilitate a chemical reaction to generate electricity. The reaction may generate heat. Furthermore, a fluid may flow through the fuel cell stack 200 and may transfer at least some of the heat away from the fuel cell stack 200. In that regard, the fuel cell stack 200 may include an inlet 228 for receiving the fluid and an outlet 230 through which the fluid exits the fuel cell stack 200.

It may be desirable for the fuel cell stack 200 to operate within a predetermined temperature range. For example, it may be desirable for the fuel cells of the fuel cell stack 200 to operate between 50 degrees Celsius (50 degrees C., 122 degrees Fahrenheit (122 degrees F.)) and 80 degrees C. (176 degrees F.).

The fuel cell stack 200 may generate more electrical energy at relatively high temperatures (i.e., when the temperature is closer to 80 degrees C. than 50 degrees C.). However, the fuel cell stack 200 may undesirably lose moisture (i.e., may dry out) when operated at these relatively high temperatures. In that regard, it may be desirable for the fuel cell stack 200 to operate closer to 80 degrees C. when a relatively large amount of electrical energy is requested, and closer to 50 degrees C. when a relatively small amount of electrical energy is requested. The fuel cell circuit 118 includes various features for increasing or decreasing the temperature of the fuel cell stack 200.

The fuel cell circuit 118 may further include an intercooler 202. The intercooler 202 may be oriented in parallel with the fuel cell stack 200. The intercooler 202 may receive a hot airflow 203 (i.e., an airflow having a greater temperature than the temperature of the fluid within the intercooler 202) and may transfer heat from the hot airflow 203 to the fluid. Accordingly, the fuel cell stack 200 and the intercooler 202 may be considered heating elements of the fuel cell circuit 118 as they both increase the temperature of the fluid. All of the fluid within the fuel cell circuit 118 eventually flows through the combination of the fuel cell stack 200 and the intercooler 202 as shown by an arrow 205.

The fuel cell circuit 118 may further include a three-way valve 204. The fuel cell circuit 118 may also include one or more radiator 210 along with a bypass branch 206 that bypasses the one or more radiator 210. The three-way valve 204 may divide the fluid between the radiators 210 and the bypass branch 206 based on a valve position of the three-way valve 204. The three-way valve 204 may have multiple valve positions each dividing the flow between the bypass branch 206 and the radiators 210 at different ratios.

For example, the three-way valve 204 may have a first position in which 80 percent (80%) of the fluid flows through the bypass branch 206 (as shown by an arrow 207) and 20% of the fluid flows through the radiators 210 (as shown by an arrow 209). The three-way valve 204 may further have a second position in which 70% of the fluid flows through the bypass branch 206 and 30% of the fluid flows through the radiators 210. The three-way valve 204 may have multiple discrete valve positions or may have infinite continuous valve positions (i.e., may direct any value between 0% and 100% of the fluid through each of the bypass branch 206 or the radiators 210).

The fluid that flows through the bypass branch 206 may avoid the radiators 210, thus allowing a majority of heat within the fluid to remain in the fluid. An ionizer 208 may receive some of the fluid that flows through the bypass branch 206. The ionizer 208 may function as an ion exchanger and may remove ions from the fluid to reduce conductivity. In that regard, the ionizer may be referred to as a de-ionizer.

The radiators 210 may transfer heat away from the fluid to a gas (such as air) flowing over or past the radiators 210. In that regard, the radiators 210 may be referred to as cooling elements of the fuel cell circuit 118.

In some embodiments, the radiators 210 may include a main radiator 212 and two secondary radiators 214, 216. A fan 218 may be oriented in such a manner as to direct a flow of gas 219 over the radiators 210. In some embodiments, the fan 218 may only direct the flow of gas 219 over the main radiator 212. The main radiator 212 has a fluid inlet 232 in which the fluid flows into the main radiator 212 and a fluid outlet 234 in which the fluid flows out of the main radiator 212. The main radiator 212 may further include an air inlet 236 that receives the gas 219 (i.e., airflow) from the fan 218 as well as an air outlet 238 in which the airflow exits the main radiator 212.

Referring briefly to FIGS. 1 and 2, one or more of the radiators 210 may further receive the airflow 122 received via the grill 120 of the vehicle 100. As mentioned above, the velocity of the airflow 122 corresponds to a speed of the vehicle 100. As the speed of the vehicle 100 increases, the velocity of the airflow 122 further increases, thus increasing the transfer of heat away from the fluid.

Returning reference to FIG. 2, the fuel cell circuit 118 may further include a pump 220. The pump 220 may include any pump capable of forcing the fluid through the fuel cell circuit 118. For example, the pump 220 may include a hydraulic pump, a diaphragm pump, a piston pump, a rotary gear pump, or the like.

The fuel cell circuit 118 may further include a reservoir 240. The reservoir may include a volume in which the fluid, such as a coolant, is stored. The fluid may be provided to the fuel cell circuit 118 from the reservoir 240. In some embodiments, the reservoir 240 may include a port through which a user of the vehicle may provide the fluid to the reservoir 240.

The fuel cell circuit 118 may further include two temperature sensors including a first temperature sensor 224 and a second temperature sensor 226. The first temperature sensor 224 may detect the temperature of the fluid exiting the fuel cell stack 200 at the outlet 230. The second temperature sensor 226 may detect the temperature of the combined fluid exiting the radiators 210. In some embodiments, greater or fewer temperature sensors may be used, and the temperature sensors may be positioned at additional or alternative locations.

Referring again to FIGS. 1 and 2, the ECU 102 may determine a target temperature of the fuel cell stack 200 based on a received power request of the vehicle 100. As described above, it may be desirable for the temperature of the fuel cell stack 200 to increase when a relatively large amount of power is requested from the fuel cell stack 200. This is because the increased temperature corresponds to an increased power output of the fuel cell stack 200. Likewise, it may be desirable for the temperature of the fuel cell stack 200 to decrease when a relatively small amount of power is requested from the fuel cell stack 200 in order to retain moisture in the fuel cell stack 200.

The ECU 102 may also receive the detected temperatures from the first temperature sensor 224 and the second temperature sensor 226. The ECU 102 may then control the actuators of the fuel cell circuit 118 (the three-way valve 204, the fan 218, and the pump 220) to cause the temperature of the fuel cell stack 200 (such as the temperature of the fluid at the outlet 230) to increase or decrease. The ECU 102 may cause the temperature to increase or decrease towards the target temperature based on the target temperature and the detected temperatures.

The three-way valve 204 may be used to adjust the temperature of the fluid by directing more of the fluid through the bypass branch 206 or through the radiators 210. For example, if the three-way valve 204 increases a flow of the fluid through the bypass branch 206 then the overall temperature of the fluid may increase because it is directed back towards the heating elements without significant loss of heat. Similarly, if the three-way valve 204 increases a flow of the fluid through the radiators 210 then the overall temperature of the fluid may decrease because more fluid is directed through the radiators 210 where thermal energy may be removed from the fluid.

The fan 218 may likewise be used to adjust the temperature of the fluid by increasing or decreasing the flow of gas 219 over the main radiator 212. For example, if the speed of the fan 218 is increased (resulting in a greater quantity of gas 219 flowing over the main radiator 212) then the temperature of the fluid may decrease as more thermal energy is transferred out of the fluid. Similarly, if the speed of the fan 218 is decreased then the temperature of the fluid may increase as less thermal energy is transferred out of the fluid.

The pump 220 may also be used to indirectly adjust the temperature of the fluid by increasing or decreasing a flow rate, such as a mass flow rate, of the fluid through the fuel cell circuit 118. As the flow rate increases, heat transfer between the fluid and the various components increases, which may result in an increase or decrease in temperature based on how much of the fluid flows through the bypass branch 206 or the radiators 210, and based on a temperature of the fuel cell stack 200. Thus, the temperature of the fluid may correspond to the flow rate of the fluid.

Figure 3:
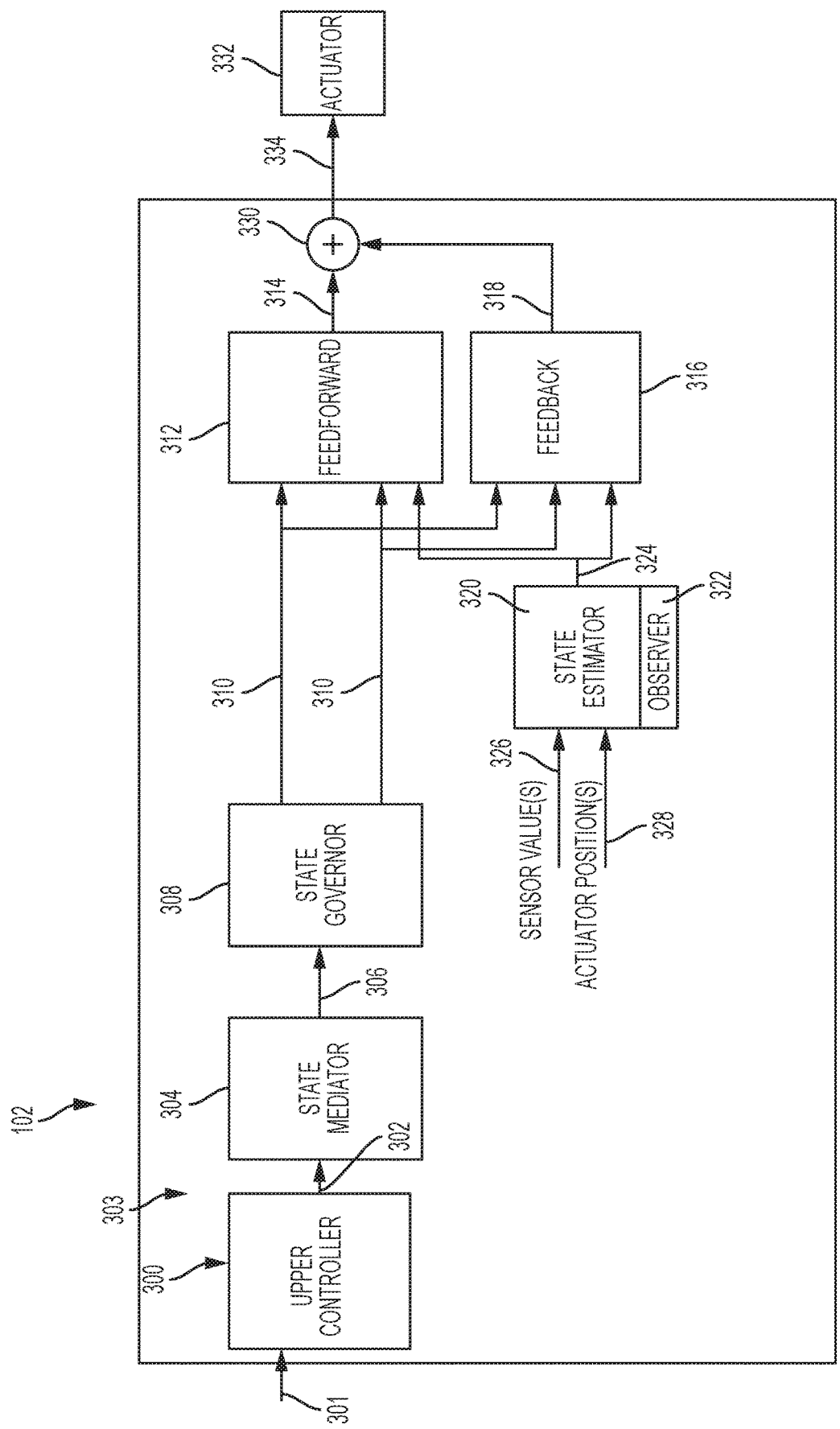
FIG. 3 is a block diagram illustrating various logic components of an electronic control unit (ECU) of the vehicle of FIG. 1 for increasing or decreasing a temperature of fluid in the fuel cell circuit according to an embodiment of the present invention.

Referring now to FIGS. 2 and 3, the ECU 102 may include a temperature control system 303 that controls the temperature of the fuel cell circuit 118. The temperature control system 303 may be implemented using specifically designated hardware of the ECU 102, or may be implemented using general hardware of the ECU 102.

The temperature control system 303 may include an upper controller 300, a state mediator 304, a state governor 308, a feedforward control 312, a feedback control 316, a state estimator 320, an observer 322, and an actuator control 330. The temperature control system 303 may receive an input, such as a power request 301, and may generate an output, such as an actuator control signal 334.

The upper controller 300 may receive the power request 301. The upper controller 300 may then identify a target temperature of the fuel cell stack 200 based on the power request 301. For example, if the power request is relatively large then the upper controller 300 may set a target temperature to be relatively high, such as 75 degrees C. (167 degrees F.). Likewise, if the power request is relatively small then the upper controller 300 may set a target temperature to be relatively low, such as 55 degrees C. (131 degrees F.). The upper controller 300 may then output an unfiltered target fuel cell temperature 302.

The state mediator 304 may receive the unfiltered target fuel cell temperature 302. The state mediator 304 may filter the received signal and output a target fuel cell temperature 306. The state mediator 304 may filter the unfiltered target fuel cell temperature 302 for various reasons. For example, the filtering may remove noise on the signal, may act as a bandpass filter to ensure that the target fuel cell temperature 306 is within a safe temperature range, or the like. The safe temperature range may correspond to a temperature range at which the temperature is unlikely to damage components of the fuel cell circuit 118 (i.e., such as by overheating or drying out) and at which the fuel cell circuit 118 is capable of generating power.

The state governor 308 may receive the target fuel cell temperature 306. The state governor 308 may generally dictate how fast the temperature of the fluid in the fuel cell circuit 118 should respond to the temperature change request (i.e., how fast the temperature should increase or decrease). The state governor 308 may output a temperature rate of change 310 corresponding to a desired rate of temperature change of the fluid (such as at the inlet 228 or the outlet 230 of the fuel cell stack 200). For example, the temperature rate of change 310 may be measured in degrees (e.g., degrees C.) per second.

The state estimator 320 may receive inputs including sensor values 326 and current actuator positions 328 (or commanded actuator positions) and may estimate conditions at various locations of the fuel cell circuit 118. The sensor values may include, for example, temperatures detected from the first temperature sensor 224 and the second temperature sensor 226. The actuator positions 328 may be received from the actuators 332 themselves (the pump 220, the three-way valve 204, and the fan 218) or from the actuator control signal 334.

The fuel cell circuit 118 includes relatively few sensors. Additional data is desirable in order to provide optimal control of the actuators 332. In that regard, the state estimator 320 may calculate or predict the additional data (i.e., current conditions) based on the sensor values 326 and the actuator positions 328. For example, the state estimator 320 may calculate or predict temperatures at locations of the fuel cell circuit 118 in which temperature sensors are not present. As another example, the state estimator 320 may calculate or predict pressure of the fluid at various locations of the fuel cell circuit 118. As yet another example, the state estimator 320 may further calculate or predict quantities of heat added to or subtracted from the fluid by the various elements of the fuel cell circuit 118. The state estimator 320 may output calculated or predicted values 324 corresponding to current conditions of the fuel cell circuit 118.

The feedforward control 312 may receive the temperature rate of change 310 from the state governor 308 along with the calculated or predicted values 324 from the state estimator 320. In some embodiments, the feedforward control 312 may further receive the detected temperatures from the temperature sensors. The feedforward control 312 may determine desired positions of the actuators 332 to achieve the desired temperature rate of change 310 of the fluid of the fuel cell circuit 118. The feedforward control 312 may determine these desired positions based on the received temperature rate of change 310 and the calculated or predicted values 324. The feedforward control 312 may output feedforward control signals 314 corresponding to the determined desired positions of the actuators 332.

The feedback control 316 may also receive the temperature rate of change 310 from the state governor 308 along with the calculated or predicted values 324 from the state estimator 320. In some embodiments, the feedback control 316 may further receive the detected temperatures from the temperature sensors. The feedback control 316 may identify whether the actuators 332 are achieving the desired temperature rate of change 310. The feedback control 316 may further generate feedback control signals 318 that correspond to adjustments to the actuators 332 to close the gap between a measured temperature rate of change and the desired temperature rate of change 310.

The observer 322 may operate as feedback control for the radiators 210. In that regard, the observer may determine a difference between a detected temperature at the outlet 227 of the radiators 210 and an estimated temperature at the outlet 227 as determined by the state estimator 320. The observer 322 may then change values determined by the state estimator 320 to cause the estimated temperature to be closer in value to the detected temperature.

The actuator control 330 may receive the feedforward control signals 314 and the feedback control signals 318 and generate actuator control signals 334 based on the combination of the feedforward control signals 314 and the feedback control signals 318. One or more of the actuator control signals 334 may be transmitted to each of the actuators 332. For example, the actuator control signals 334 may include a first signal that controls a valve position of the three-way valve 204, a second signal that controls a fan speed of the fan 218, and a third signal that controls a pump speed of the pump 220. In some embodiments, the actuator control 330 may generate the actuator control signals 334 by adding the feedforward control signals 314 and the feedback control signals 318.

Figure 4:
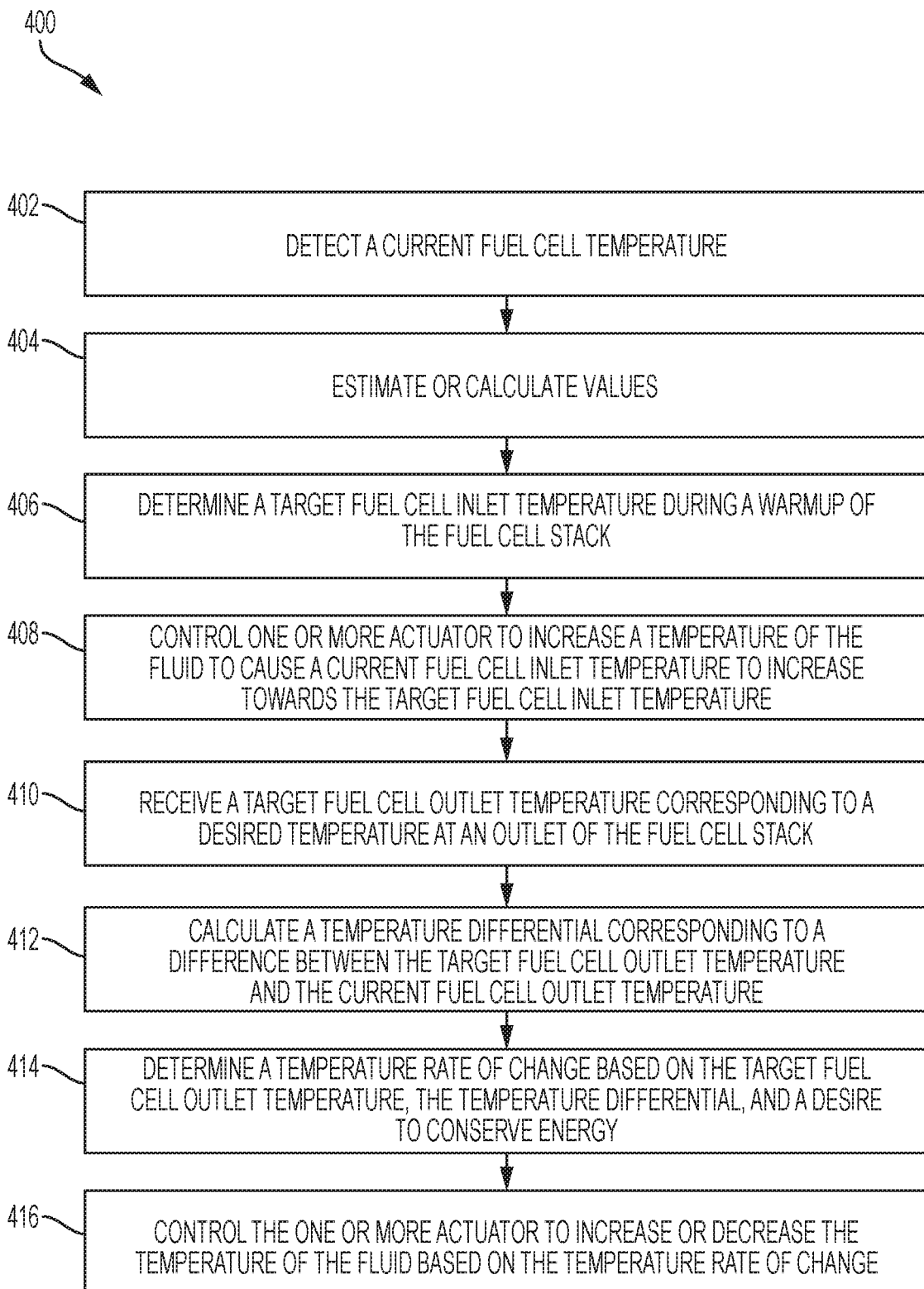
FIG. 4 is a flowchart illustrating a method for determining a desired temperature rate of change of a fuel cell circuit in order to cause a temperature of fluid to reach a desired temperature of the fluid according to an embodiment of the present invention.

Referring now to FIG. 4, a method 400 for determining a desired temperature rate of change of a fuel cell circuit, such as the fuel cell circuit 118 of FIG. 2, is shown. The method 400 may be performed by a state governor, such as the state governor 308 of FIG. 3.

In block 402, one or more temperature sensor of a fuel cell circuit may detect a current temperature corresponding to a temperature of fluid within the fuel cell circuit. For example, the first temperature sensor 224 may detect a temperature of the fluid at the outlet 230 of the fuel cell stack 200, and the second temperature sensor 226 may detect a temperature of the fluid at the outlet 227 of the radiators.

In block 404, the ECU of the vehicle may estimate or calculate additional values corresponding to the fuel cell circuit. For example, the state estimator 320 of FIG. 3 may estimate or calculate values based on the detected temperatures and the current actuator positions. The additional values may include, for example, temperatures of the fuel cell circuit at locations other than the locations of the temperature sensors, pressures at various locations along the fuel cell circuit, or the like.

In block 406, if the vehicle or fuel cell stack is warming up from a cold start (i.e., such as when the vehicle is initially turned on) then the ECU may determine a fuel cell inlet temperature command value. The ECU may determine the target fuel cell inlet temperature based on the temperatures detected in block 402 and the values calculated in block 404. For example, the target fuel cell inlet temperature may be determined using equation 1 below.

$$T_{FC_{in_{cmd}}} = \min(\max(T_{FC_{cmd}} - \Delta T_{FC_{tgt}}, T_{FC_{in\ cmd\ previous}}), T_{FC_{in\ tgt}})$$ Equation 1

In equation 1, $T_{FC_{in_{cmd}}}$ corresponds to the target fuel cell inlet temperature. $T_{FC_{cmd}}$ corresponds to the target fuel cell outlet temperature, which is set to be equal to the detected fuel cell outlet temperature of the fuel cell stack during the warm-up. $\Delta T_{FC_{tgt}}$ corresponds to a target temperature difference between the fuel cell inlet temperature and the fuel cell outlet temperature, and is determined by the upper controller. $T_{FC_{in\ cmd\ previous}}$ corresponds to the target fuel cell inlet temperature determined during a previous calculation of equation 1. $T_{FC_{in\ tgt}}$ corresponds to a final target fuel cell inlet temperature, which is the final desired operating temperature of the fluid at the inlet.

After the fuel cell circuit has warmed up, the final target fuel cell inlet temperature remains relatively constant, and thus is a stable (i.e., unchanging) value during operation of the fuel cell circuit. Stated differently, the final target fuel cell inlet temperature remains relatively unchanged throughout operation of the vehicle after the initial warmup.

Figure 5:
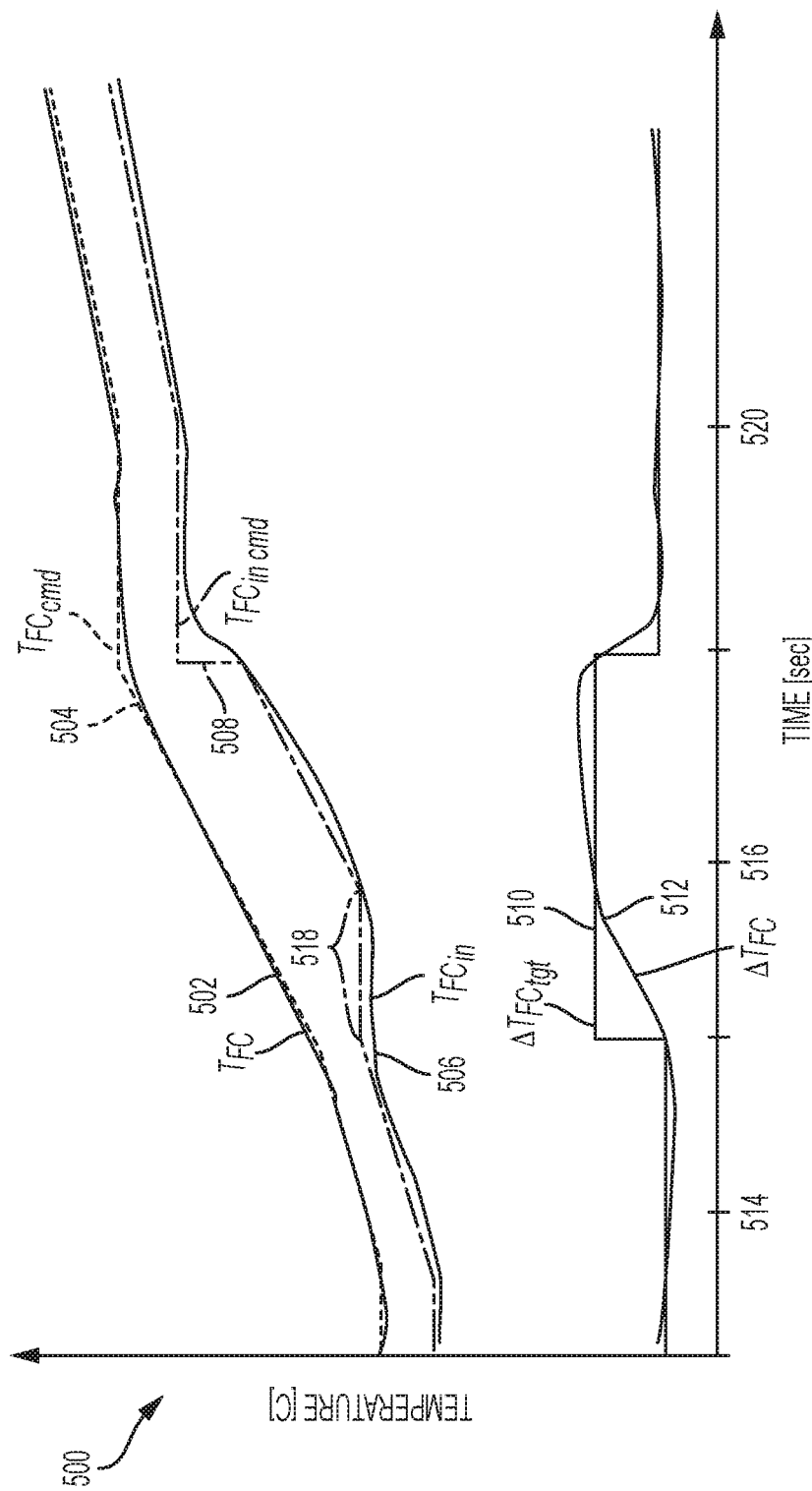
FIG. 5 is a graph illustrating an exemplary implementation of the method of FIG. 4 according to an embodiment of the present invention.

Referring briefly to FIG. 5, a graph 500 illustrates implementation of equation 1 by the ECU to set the target fuel cell inlet temperature. In particular, the graph 500 illustrates the current fuel cell outlet temperature 502, the target fuel cell outlet temperature 504, the current fuel cell inlet temperature 506, and the target fuel cell inlet temperature 508. The graph 500 further illustrates the target temperature difference 510 between the fuel cell inlet temperature and the fuel cell outlet temperature, and the current temperature difference 512.

During a first segment 514 of an initial warm-up, the target fuel cell inlet temperature 508 increases simultaneously with the current fuel cell outlet temperature 502. The target fuel cell inlet temperature 508 is calculated as the difference between the current fuel cell outlet temperature 502 and the target temperature difference 510.

At the beginning of a second segment 516, the upper controller has increased the target temperature difference 510. Because the target fuel cell inlet temperature 508 is calculated as the difference between the current fuel cell outlet temperature 502 and the target temperature difference 510, the target fuel cell inlet temperature 508 remains constant for a period of time 518 until the current temperature difference 512 is equal to the target temperature difference 510. The target fuel cell inlet temperature 508 begins increasing again when the current temperature difference 512 is equal to or exceeds the target temperature difference 510.

The target temperature difference 510 decreases at the beginning of a third segment 520 of the warm-up. Accordingly, the target fuel cell inlet temperature 508 increases to again be equal to the difference between the current fuel cell outlet temperature 502 and the reduced target temperature difference 510.

By setting the target fuel cell inlet temperature 508 to be equal to the minimum of the calculated value or the final target fuel cell inlet temperature, equation 1 ensures that the target fuel cell inlet temperature 508 fails to exceed the final target fuel cell inlet temperature.

Referring now to FIGS. 4 and 5 and in block 408, the ECU may control one or more actuator of the fuel cell circuit to increase a temperature of the fluid to cause the current fuel cell inlet temperature to be equal to the target fuel cell inlet temperature. For example, the ECU may control one or more of a three-way valve, a radiator fan, or a pump to increase the temperature of the fluid. As shown in the graph 500, the current fuel cell inlet temperature 506 remains relatively similar to the target fuel cell inlet temperature 508 during the entire warm-up.

Returning reference to FIG. 4, the ECU may receive or calculate a target fuel cell outlet temperature in block 410. The target fuel cell outlet temperature may correspond to a desired temperature of the fluid at the outlet of the fuel cell stack and may be determined by one or more of an upper controller or a state mediator of the ECU. As shown, the ECU may control the temperature of the fluid of the fuel cell circuit using a target fuel cell inlet temperature during the initial warm-up, and may control the temperature of the fluid of the fuel cell circuit using a target fuel cell outlet temperature during normal operation after the initial warm-up.

In block 412, the ECU may calculate a temperature differential. The temperature differential may correspond to a difference between the target fuel cell outlet temperature and the current fuel cell outlet temperature.

In block 414, the ECU may determine a temperature rate of change. The temperature rate of change may correspond to a desired rate of increase or decrease of the temperature of the fluid at a particular location, such as at the outlet of the fuel cell stack. The temperature rate of change may be represented as dT/dt ("T" representing temperature and "t" representing time), and may have units of degrees per second (such as degrees C./second).

The ECU may determine the temperature rate of change based on the target fuel cell outlet temperature received from the upper controller, the temperature differential calculated in block 412, and a desire to conserve energy. For example, if the temperature differential is relatively low it may be desirable to use relatively little energy to warm-up the fuel cell stack in order to increase energy efficiency of the vehicle.

In some embodiments, the ECU may determine the temperature rate of change by comparing the target fuel cell outlet temperature and the temperature differential to a lookup table stored in a memory.

Figure 6:
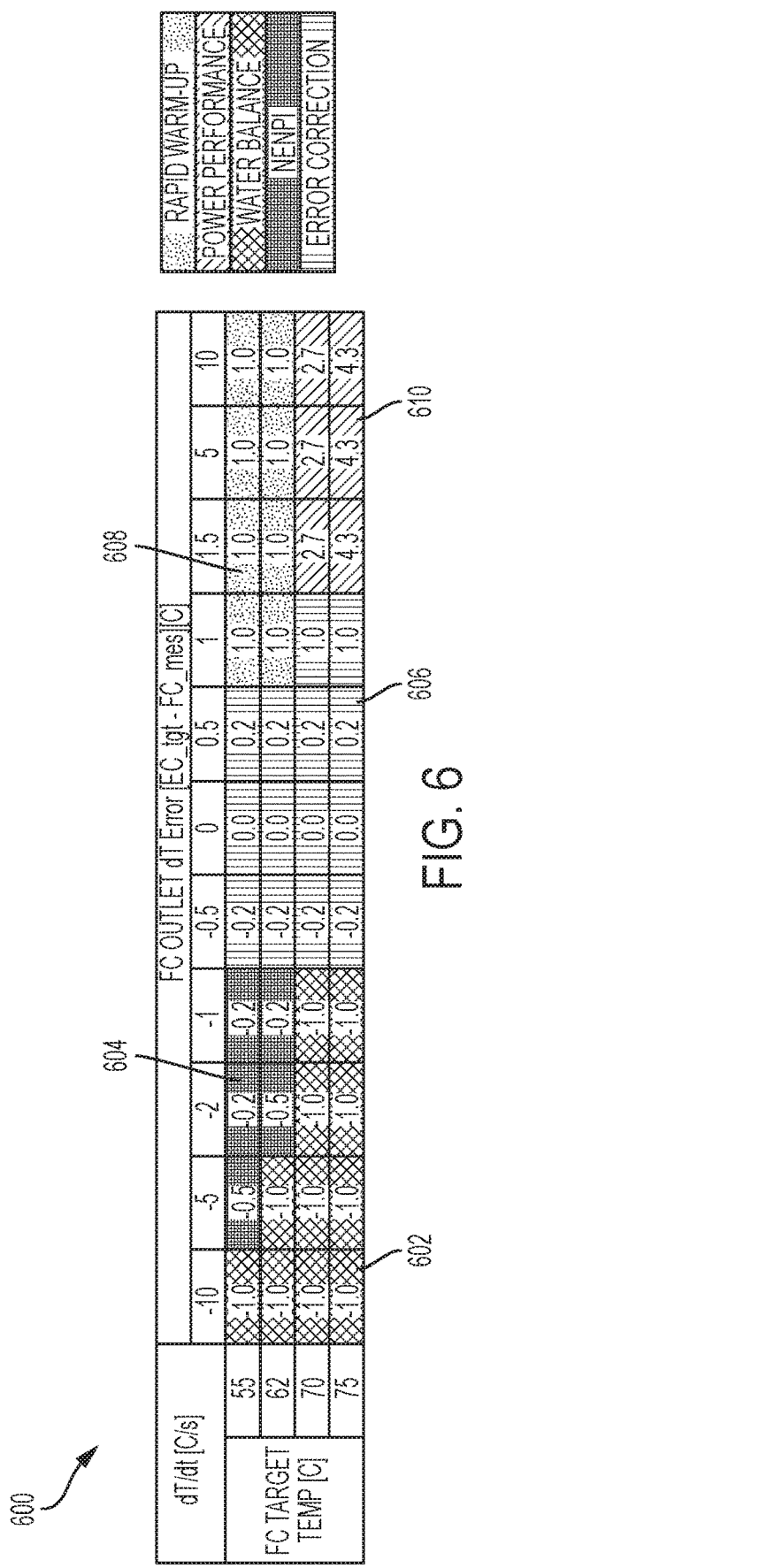
FIG. 6 illustrates a lookup table that maps target fuel cell outlet temperatures to temperature differentials according to an embodiment of the present invention.

Referring now to FIG. 6, an exemplary lookup table 600 is shown. The Y axis of the lookup table 600 corresponds to the target fuel cell outlet temperature and the X axis corresponds to the temperature differential. A negative temperature differential indicates that it is desirable for the current fuel cell outlet temperature to decrease and a positive temperature differential indicates that it is desirable for the current fuel cell outlet temperature to increase. Likewise, a negative temperature rate of change corresponds to a decreasing temperature rate, and a positive temperature rate of change corresponds to an increasing temperature rate.

As shown, the lookup table 600 includes a plurality of regions. The regions include a rapid temperature decrease region 602, a reduced energy temperature decrease region 604, an error correction region 606, a reduced energy temperature increase region 610, and a rapid temperature increase region 610. The rapid temperature decrease region 602 and the rapid temperature increase region 612 each correspond to a relatively high temperature rate of change.

The relatively high temperature rates of change may be selected based on capabilities of the system. For example, the rapid temperature decrease region 602 may have a temperature rate of change of 1 degree C. per second, which may be a maximum temperature decrease rate that the fuel cell circuit is capable of achieving. Likewise, the rapid temperature increase region 612 may have a maximum temperature rate of change of 4.3 degrees C. per second, which may be a maximum temperature increase rate that the fuel cell circuit is capable of achieving.

The temperature rates of change in the rapid temperature decrease region 602 may be desirable when the fuel cell outlet temperature is to be decreased significantly. In that regard, the relatively high rate of temperature decrease in the rapid temperature decrease region 602 may reduce the likelihood of the fuel cell stack drying out. Likewise, the temperature rate of change in the rapid temperature increase region 610 may be desirable when the fuel cell outlet temperature is to be increased significantly. In that regard, the relatively high rate of temperature increase in the rapid temperature increase region 610 may allow the fuel cell stack to provide a relatively large amount of power when a relatively large power request is received.

The relatively high temperature rates of change may be relatively energy inefficient and thus may be undesirable for relatively small temperature changes. In that regard, the reduced energy rates of change may correspond to temperature increase and decrease rates that are relatively energy efficient. Accordingly, the reduced energy rates of change may be less than the relatively high temperature rates of change, but may also be more energy-efficient than the relatively high temperature rates of change.

The error correction rates of change may be less than the reduced energy rates of change, and may be more energy efficient than the reduced energy rates of change. In that regard, the error correction rates of change may be utilized to correct relatively small differences between the target fuel cell outlet temperature and the actual fuel cell outlet temperature.

Returning reference to FIG. 4, the ECU may control the one or more actuator of the fuel cell circuit to increase or decrease the temperature of the fluid based on the temperature rate of change that was determined in block 414.

Figure 7:
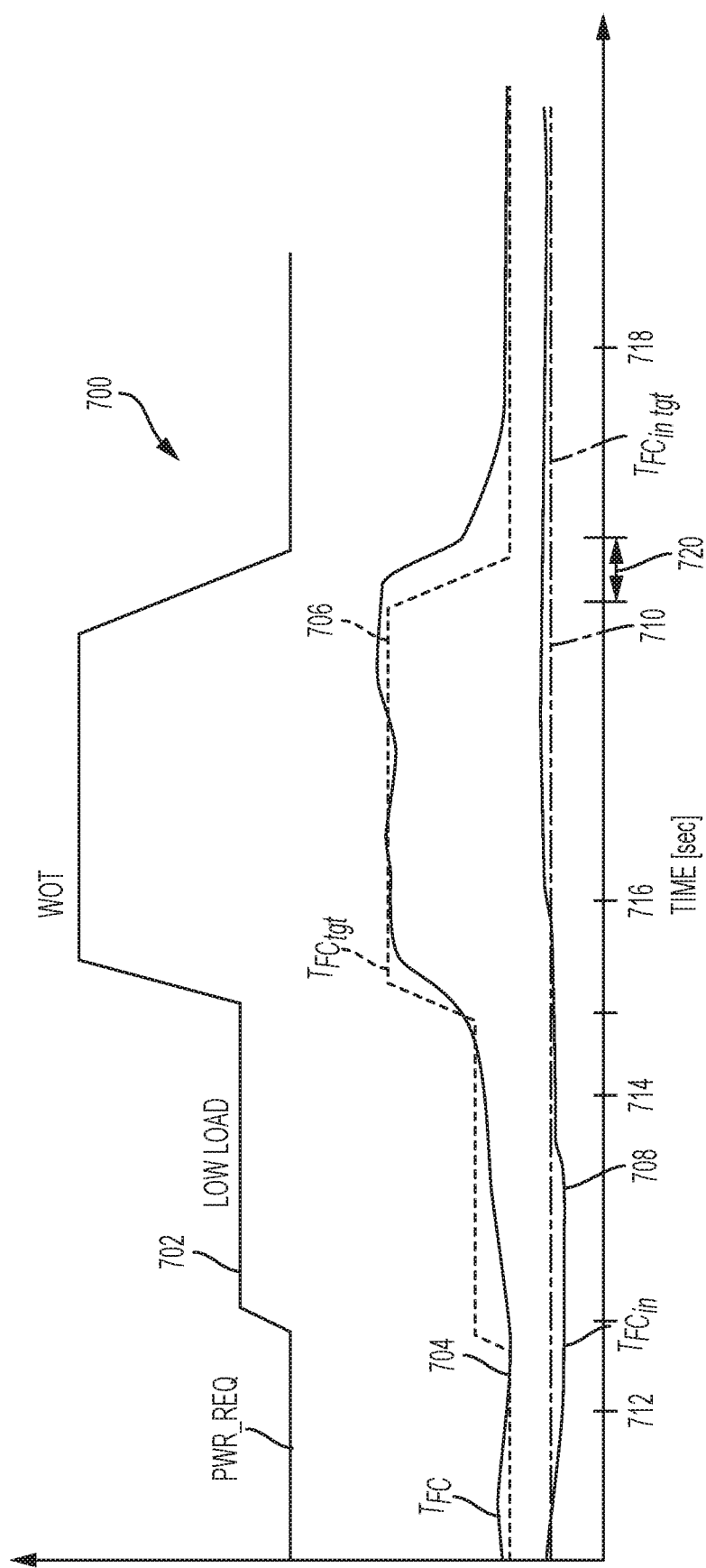
FIG. 7 is a graph illustrating requested and actual temperatures of fluid of a fuel cell circuit controlled using a method similar to the method of FIG. 4 according to an embodiment of the present invention.

Referring now to FIG. 7, a graph 700 illustrates a power request signal 702 corresponding to a power request of the vehicle. The graph 700 further illustrates a current fuel cell outlet temperature 704 and a target fuel cell outlet temperature 706, along with a current fuel cell inlet temperature 708 and a target fuel cell inlet temperature 710. As described above and shown in FIG. 7, the target fuel cell inlet temperature 710 remains constant throughout operation of the vehicle. In that regard, the current fuel cell inlet temperature 708 also remains relatively constant.

The ECU may control the current fuel cell outlet temperature based on the previously determined temperature rate of change. During a first time window 712 the power request signal 702 is low, corresponding to a lack of power request. Accordingly, the target fuel cell outlet temperature 706 remains at a relatively low value throughout the first time window 712, and the current fuel cell outlet temperature 704 remains relatively the same as the target fuel cell outlet temperature 706.

At the beginning of a second time window 714, the power request signal 702 increases to a relatively low value, corresponding to a relatively low amount of energy being requested from the fuel cell stack. Accordingly, the target fuel cell outlet temperature 706 increases by a relatively small amount. Accordingly, the temperature differential may be relatively small such that the temperature rate of change falls within the reduced energy temperature increase region as a rapid temperature increase is unnecessary. Because the ECU controls the actuators to increase the temperature at the reduced energy temperature rate of change, the current fuel cell outlet temperature 704 may increase gradually during the second time window 714.

At the beginning of a third time window 716, the power request signal 702 increases to a wide open throttle (WOT) power request which corresponds to a relatively large amount of energy being requested from the fuel cell stack. Accordingly, the target fuel cell outlet temperature 706 increases by a relatively large amount. As a result, the temperature differential may be relatively large such that the temperature rate of change falls within the rapid temperature increase region to facilitate the relatively large amount of energy requested of the fuel cell stack.

Because the ECU controls the actuators to increase the temperature at the rapid temperature rate of change, the current fuel cell outlet temperature 704 may increase relatively rapidly at the beginning of the third time window 716. Accordingly, the current fuel cell outlet temperature 704 may reach the target fuel cell outlet temperature 706 relatively quickly.

At the beginning of a fourth time window 718, the power request signal 702 decreases to a low power request which corresponds to a relatively small amount of energy being requested from the fuel cell stack. Accordingly, the target fuel cell outlet temperature 706 decreases by a relatively large amount. The temperature differential corresponding to this rapid decrease of the target fuel cell outlet temperature 706 may be relatively large such that the temperature rate of change falls within the rapid temperature decrease region to prevent dry out of the fuel cell stack. Because the ECU controls the actuators to decrease the temperature at the rapid temperature rate of change, the current fuel cell outlet temperature 704 may decrease relatively rapidly at the beginning of the fourth time window 718.

After a relatively short period of time 720 the ECU may determine that the current fuel cell outlet temperature 704 is sufficiently small that dry out of the fuel cell stack is unlikely to occur. Furthermore, the temperature differential has decreased after the period of time 720 due to the decreased current fuel cell outlet temperature 704. Thus, the temperature rate of change may change to the reduced energy temperature decrease region in order to conserve energy. Thus, after the period of time 720 has elapsed, the current fuel cell outlet temperature 704 may decrease more gradually due to the newly reduced temperature rate of change.

Figure 8A:
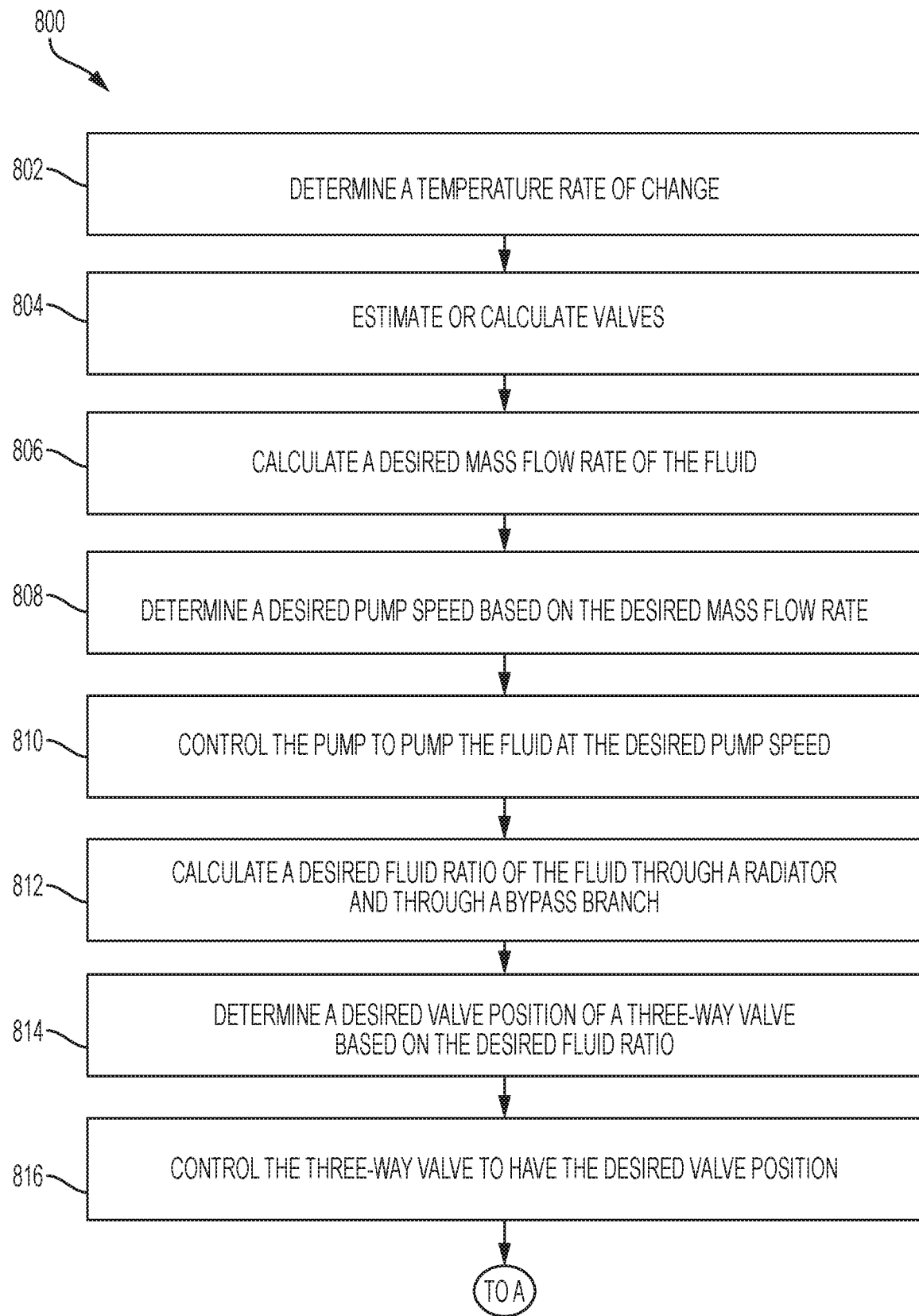
FIGS. 8A and 8B are flowcharts illustrating a method feedforward control of one or more actuator of a fuel cell circuit to heat or cool the fuel cell circuit using according to an embodiment of the present invention.
Figure 8B:
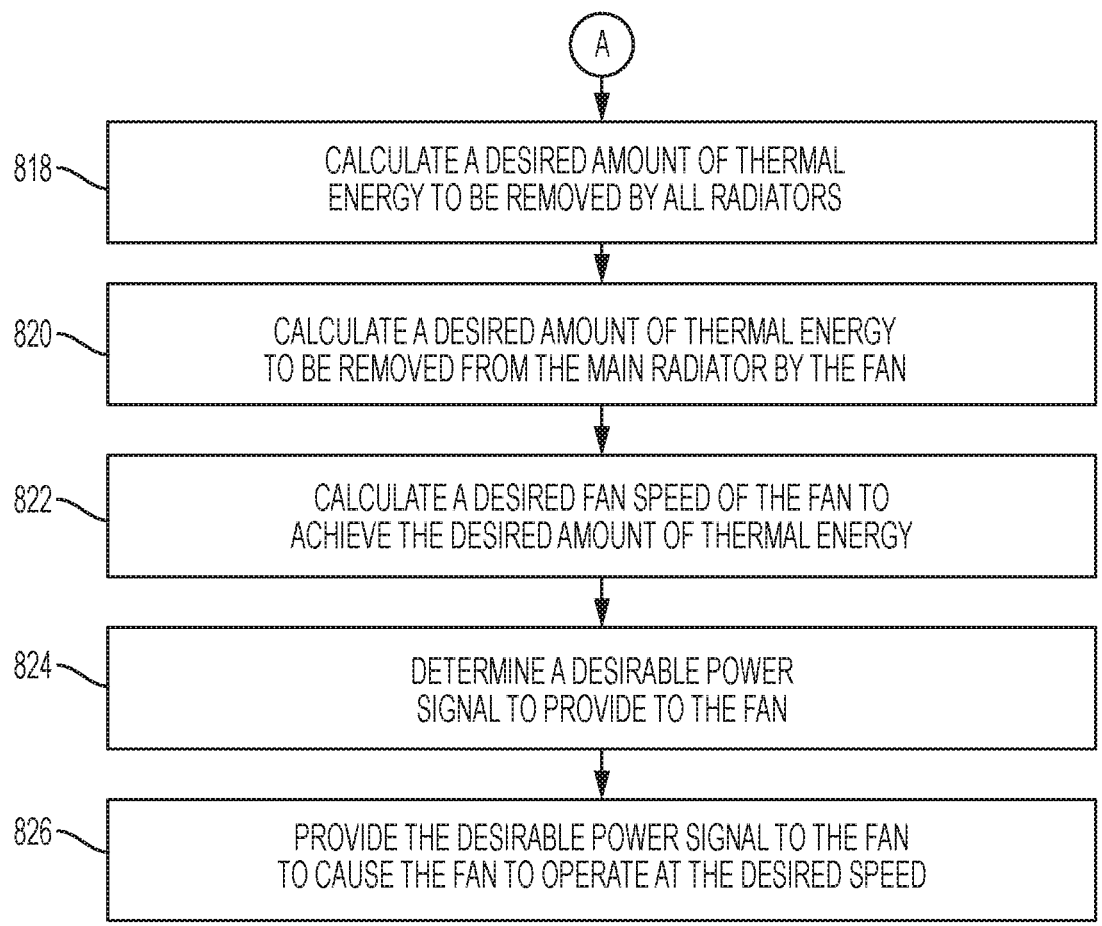

Referring now to FIGS. 8A and 8B, a method 800 for feedforward control of one or more actuator of the fuel cell circuit to heat or cool the fuel cell circuit is shown. The method 800 may be performed, for example, by a feedforward control of an ECU such as the feedforward control 312 of the ECU 102 of FIG. 3.

In block 802, the ECU may determine a temperature rate of change. The temperature rate of change may be determined using a method similar to the method 400 of FIG. 4. In some embodiments, the ECU may also or instead determine or receive another temperature control signal corresponding to a desired pressure(s) at various locations along the fuel cell circuit, or the like.

In block 806, the ECU may calculate a desired mass flow rate of the fluid that corresponds to the temperature rate of change. The ECU may calculate the desired mass flow rate based on the temperature rate of change determined in block 802 as well as the estimated or calculated values determined in block 804. For example, the ECU may calculate the desired mass flow rate using an equation similar to equation 2 below:

$$\dot{m}_{FF} = \frac{V_{eq}\rho_{eq}c_{eq}\frac{dT}{dt} - Q_{FC}}{\left(c(\Delta T) + \frac{1}{\rho}(P_{FC_{in}} - P_{FC_{out}})\right)} \qquad \text{Equation 2}$$

In equation 2, $\dot{m}_{FF}$ represents the desired mass flow rate of the fluid through a fuel cell stack, such as the fuel cell stack 200 of FIG. 2. $V_{eq}$ represents an equivalent volume of the fluid (including a coolant and water) and the fuel cell stack, and is a physical property of the fluid and fuel cell stack. $\rho_{eq}$ represents an equivalent density of the fluid and the fuel cell stack and may be received from the state estimator in block 804. $c_{eq}$ represents an equivalent specific heat of the fluid in the fuel cell stack and may also be received from the state estimator in block 804.

$$\frac{dT}{dt}$$

represents the temperature rate of change calculated in block 802. $Q_{FC}$ represents an amount of heat generated by the fuel cell stack and may be received from the state estimator in block 804. c represents the specific heat of the fluid and may be received from the state estimator in block 804. $\Delta T$ represents a difference between the target fuel cell inlet temperature and the target fuel cell outlet temperature ($T_{FC_{in\,cmd}} - T_{FC_{cmd}}$) and may be received from a state governor, such as the state governor 308 of FIG. 3, or from a state estimator in block 804. $\rho$ represents the density of the fluid and may be received from the state estimator in block 804. $P_{FC_{in}}$ represents a current pressure of the fluid at an inlet of the fuel cell stack and $P_{FC_{out}}$ represents a current pressure of the fluid at an outlet of the fuel cell stack, both of which may be received from the state estimator in block 804.

Referring to FIG. 2 and as described above, $\dot{m}_{FF}$ represents the desired mass flow rate of the fluid through the fuel cell stack 200. However, the fluid output by the pump 220 is received by both the fuel cell stack 200 and the intercooler 202. In that regard, it is desirable for the ECU to further calculate the desired mass flow rate of the fluid through the pump 220 (i.e., a sum of the mass flow rate through the fuel cell stack 200 and the intercooler 202), also referred to as a total desired mass flow rate. The ECU may utilize a state estimator, such as the state estimator 320 of FIG. 3, to calculate the total desired mass flow rate through the pump 220.

Returning reference to FIGS. 8A and 8B, the ECU may determine a desired pump speed of the pump based on the total desired mass flow rate calculated in block 808. In some embodiments, the memory of the vehicle may store a lookup table that maps desired mass flow rates to corresponding pumps speeds. In these embodiments, the ECU may compare the desired mass flow rate calculated in block 806 to the lookup table and retrieve the pump speed that corresponds to the desired mass flow rate.

In some embodiments, the ECU may determine the desired pump speed based on a sum of the total desired mass flow rate calculated in block 806 and an adjustment to the total desired mass flow rate calculated by a feedback control, such as the feedback control 316 of FIG. 3. In that regard, the desired pump speed may be a function of the total desired mass flow rate, the adjustment to the total desired mass flow rate, and a difference in pressure between an outlet of the pump and an inlet of the pump. The difference in pressure between the outlet of the pump and the inlet of the pump may correspond to a total pressure drop over the fuel cell circuit. The ECU may compare the results of the function to a lookup table and retrieve the desired pump speed from the lookup table based on the comparison.

In block 810, the ECU may control the pump to pump the fluid through the fuel cell circuit at the desired pump speed determined in block 808.

In block 812, the ECU may calculate a desired fluid split ratio of the fluid that is output by a three-way valve, such as the three-way valve 204 of FIG. 2. Referring briefly to FIG. 2, the desired fluid split ratio may correspond to a ratio of fluid that is directed towards the radiators 210 to fluid that is directed through the bypass branch 206. In some embodiments, the desired fluid split ratio may represent a percentage of the total fluid output by the three-way valve 204 that is directed towards the radiators 210, or may represent a percentage of the total fluid output by the three-way valve 204 that is directed through the bypass branch 206.

Returning reference to FIGS. 8A and 8B, the ECU may calculate the desired fluid split ratio using an equation similar to equation 3 below.

$$\rightarrow Z_{FF} = \frac{(T_{pump\ in} - T_{bypass})}{(T_{rad\ out} - T_{bypass})} \quad \text{Equation 3}$$

In equation 3, $Z_{FF}$ represents the desired fluid split ratio calculated by the feedforward control and corresponds to a percentage of the total fluid output by the three-way pump that is directed through the radiators. $T_{pump\ in}$ represents a temperature of an inlet of the pump and may be calculated by the state estimator in block 804. $T_{bypass}$ represents a temperature of the fluid directed through the bypass branch, which may be calculated at an outlet of the three-way valve that outputs fluid to the bypass branch, and may be calculated by the state estimator in block 804. $T_{rad\ out}$ corresponds to a temperature of the fluid at an outlet of the radiators and may be detected using a temperature sensor, such as the second temperature sensor 226 of FIG. 2.

In block 814, the ECU may determine a desired valve position of the three-way valve based on the desired fluid split ratio calculated in block 812. In some embodiments, the memory of the vehicle may store a lookup table that maps desired fluid split ratios to corresponding valve positions. In these embodiments, the ECU may compare the desired fluid split ratio calculated in block 812 to the lookup table and retrieve the desired valve position that corresponds to the desired fluid split ratio.

In some embodiments, the ECU may determine the desired valve position based on a sum of the desired fluid split ratio calculated in block 812 and an adjustment to the desired fluid split ratio calculated by the feedback control. In that regard, the desired valve position may be a function of the desired fluid split ratio and the adjustment to the desired fluid split ratio. The ECU may compare the results of the function to a lookup table and retrieve the desired valve position based on the comparison.

In block 816, the ECU may control the three-way valve to have the desired valve position that was determined in block 814.

In block 818, the ECU may calculate a desired amount of thermal energy (i.e., heat) to be removed by radiators of the fuel cell circuit (including main and secondary radiators such as the main radiator 216 and the secondary radiators 214 and 216 of FIG. 2). The ECU may calculate the desired amount of thermal energy to be removed by the radiators using an equation similar to equation 4 below.

$$Q_{rad_{total}} = V_{eq}\rho_{eq}c_{eq}\frac{dT}{dt} - Q_{FC} - Q_{IC} \quad \text{Equation 4}$$

In equation 4, $Q_{rad_{total}}$ represents the desired amount of thermal energy (i.e., heat) to be removed by all radiators of the fuel cell circuit. $V_{eq}$ represents an equivalent volume of the fluid (including a coolant and water) and the fuel cell stack, and is a physical property of the fluid and fuel cell stack. $\rho_{eq}$ represents an equivalent density of the fluid and the fuel cell stack and may be received from the state estimator in block 804. $c_{eq}$ represents an equivalent specific heat of the fluid and the fuel cell stack and may also be received from the state estimator in block 804.

$$\frac{dT}{dt}$$

represents the temperature rate of change calculated in block 802. $Q_{FC}$ represents an amount of heat generated by the fuel cell stack (i.e., a stack heating amount) and may be received from the state estimator in block 804. $Q_{IC}$ represents an amount of heat generated by the intercooler (i.e., an intercooler heating amount) and may be received from the state estimator in block 804.

In block 820, the ECU may calculate a desired amount of thermal energy to be removed from the main radiator by the fan. The ECU may make this calculation using the desired amount of thermal energy to be removed by all radiators that was calculated in block 818. The ECU may calculate the desired amount of thermal energy to be removed from the main radiator by the fan using an equation similar to equation 5 below.

$$Q\mathrm{rad}_{main_{fan}} = Q_{rad_{total}} - Q_{rad_{sub}}1 - Q\mathrm{rad}_{sub}2 - Q\mathrm{rad}_{main_{amb}} \quad \text{Equation 5:}$$

In equation 5, $Q\mathrm{rad}_{main_{fan}}$ represents the desired amount of thermal energy to be removed from the main radiator by the fan. $Q_{rad_{total}}$ represents the desired amount of thermal energy to be removed by all radiators that was calculated in block 818. $Q_{rad_{sub}}1$ represents an amount of thermal energy dissipated by the first secondary radiator and $Q_{rad_{sub}}2$ represents an amount of thermal energy dissipated by the second secondary radiator (i.e., a secondary amount of thermal energy). $Q_{rad_{sub}}1$ and $Q_{rad_{sub}}2$ may be received from the state estimator in block 804, and may be calculated using an equation that is based on a temperature and velocity of ambient air that flows over the secondary radiators. $Qrad_{main_{amb}}$ represents an amount of thermal energy dissipated by the main radiator due to the ambient air (i.e., airflow other than that generated by the fan).

Because the fan does not blow the air over the secondary radiators, the secondary radiators may reject heat into an air flow received through a grill of the vehicle, which may vary based on a speed of the vehicle. Furthermore, the main radiator may receive the airflow through the grill which may affect the value of $Qrad_{main_{amb}}$. In that regard, the values of $Q_{rad_{sub}}1$, $Q_{rad_{sub}}2$, and $Qrad_{main_{amb}}$ may be based on an amount of airflow received via the grill (which is based on a speed of the vehicle), a temperature of the airflow, and an amount of the fluid that flows through each of the radiators. Therefore, the ECU may receive the vehicle speed and may calculate the values of $Q_{rad_{sub}}1$, $Q_{rad_{sub}}2$, and $Qrad_{main_{amb}}$ based on the received vehicle speed. The ECU may further estimate the temperature of the ambient air based on a temperature sensor located in or on the vehicle.

In block 822, the ECU may calculate a desired fan speed of the fan to achieve the desired amount of thermal energy to be removed from the main radiator by the fan. The ECU may calculate the desired fan speed using an equation similar to equation 6 below.

$$kf_{rad_{main_{fan}}} = \frac{Qrad_{main_{fan}}}{(Trad_{main} - Tair\_in)} \quad \text{Equation 6}$$

In equation 6, $kf_{rad_{main_{fan}}}$ represents a radiator heat transfer coefficient. This coefficient is a function of the flow rate of the fluid and a speed of the air through the radiator, and may be determined experimentally. This coefficient may be used (along with a current flow rate of the fluid) to solve for an angular velocity of the fan (i.e., fan speed), which corresponds to a desirable voltage level of the fan. $Qrad_{main_{fan}}$ represents the desired amount of thermal energy to be removed from the main radiator by the fan that was calculated in block 820. $Trad_{main}$ represents a temperature of the fluid at a fluid inlet of the main radiator and may be received from the state estimator in block 804. Tair_in represents a temperature of the air at an air inlet of the main radiator and may likewise be received from the state estimator in block 804.

After calculating the radiator heat transfer coefficient, the ECU may then determine a desired fan speed. The ECU may determine the desired fan speed using a lookup table. In particular, the ECU may compare the radiator heat transfer coefficient to a lookup table and retrieve a corresponding desired fan speed.

In some embodiments, the ECU may determine the desired fan speed based on a function of the radiator heat transfer coefficient and a volumetric flow rate of the fluid through an inlet of the main radiator. In some embodiments, the ECU may compare the result of the function to a lookup table and retrieve the desired fan speed based on the comparison.

In block 824, the ECU may determine a desirable power signal to provide to the fan. The desirable power signal may be based on one or both of the radiator heat transfer coefficient or the desired fan speed. For example, the ECU may compare the desired fan speed to a lookup table and retrieve a corresponding desirable power signal to provide to the fan. In some embodiments, the desirable power signal may correspond to a direct current (DC) power signal having a specific voltage. In some embodiments, the desirable power signal may correspond to an alternating current (AC) power signal having a specific root mean square (RMS) voltage or a specific duty cycle. In that regard, the desirable power signal may include one or more of a specific voltage (DC or RMS) or a specific duty cycle of the power signal.

In block 826, the ECU may provide the desirable power signal to the fan to cause the fan to operate at the desired speed to blow air towards the main radiator at the desirable speed of the air.

In some embodiments, the ECU may control the fan of the radiator in a different manner than that shown in blocks 818 to 826. In particular, the ECU may compare a radiator outlet temperature, corresponding to the temperature of the fluid at the outlet of the radiator, to a target fuel cell inlet temperature. For example, the ECU may determine whether the radiator outlet temperature is greater than or equal to a sum of the target fuel cell inlet temperature and a threshold temperature, such as 3 degrees C., 5 degrees C., 7 degrees C., or the like. If the radiator outlet temperature is greater than or equal to the sum, then the ECU may initiate a fan-on event. When the radiator outlet temperature becomes less than the sum, then the ECU may cancel the fan-on event. The ECU may control the fan to turn on when the fan-on event is initialized, and to turn off when the fan-on event is cancelled.

In some embodiments, the ECU may latch the fan-on event. For example, the ECU may control the fan-on event to remain in place for a predetermined period of time after initiating the fan-on event and before cancelling the fan-on event. The predetermined period of time may correspond to a sufficient time period to reduce the likelihood of the fan oscillating between an "on" state and an "off" state frequently enough to irritate a driver. In that regard, the latching may reduce the likelihood of the fan oscillating between "on" and "off," which may be undesirable.

In some embodiments, the ECU may latch the fan-on event by adjusting the threshold temperature based on whether the ECU is initiating the fan-on event or is cancelling the fan-on event. For example, the ECU may set the threshold temperature to be 6 degrees C. when initiating the fan-on event, and may set the threshold temperature to be 8 degrees C. when cancelling the fan-on event. In that regard, the ECU may initiate the fan-on event when the temperature reaches a first value, such as 48 degrees C., and may cancel the fan-on event when the temperature reaches a second value, such as 46 degrees C.

Figure 9A:
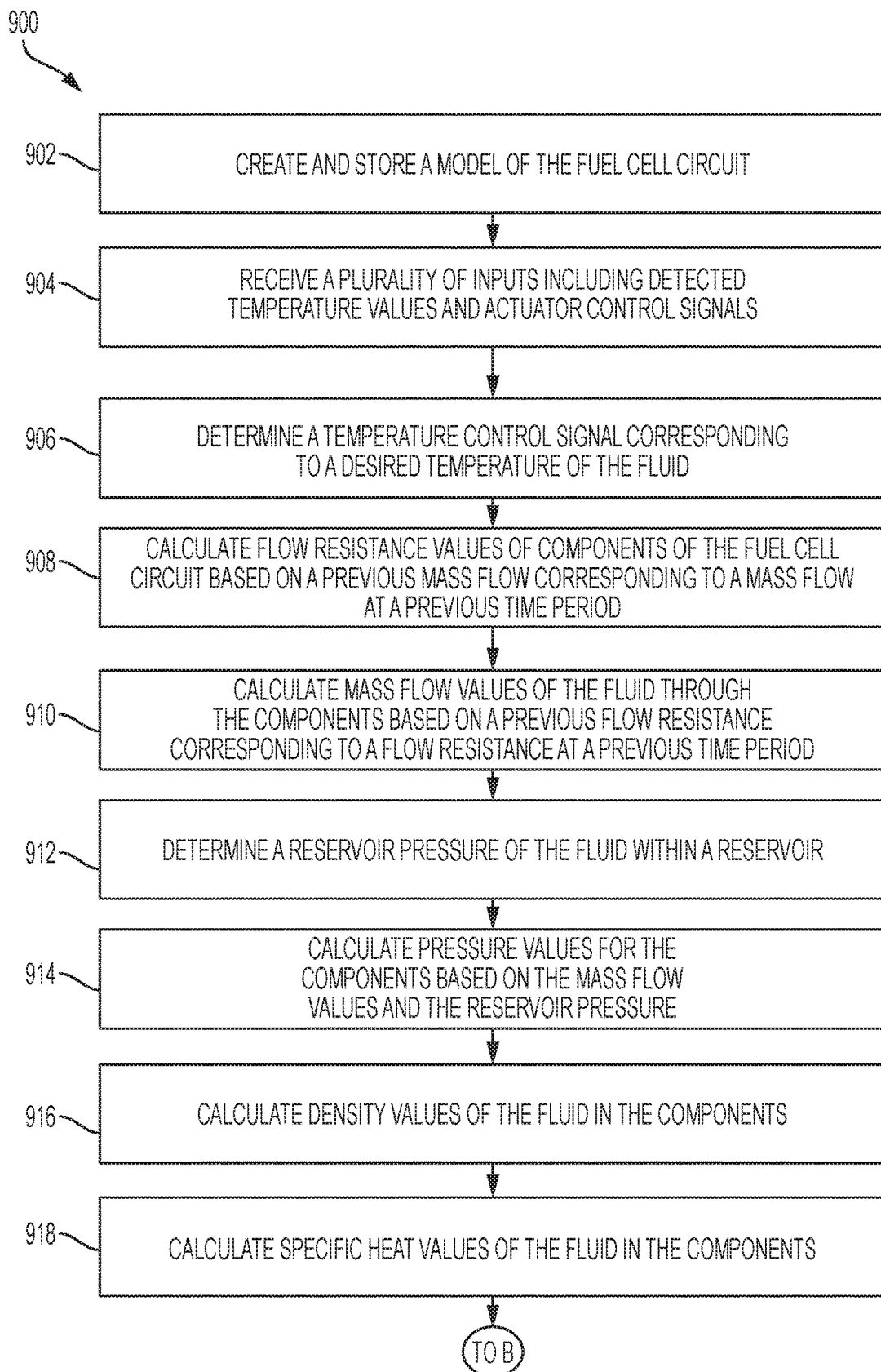
FIGS. 9A and 9B are flowcharts illustrating a method for estimating parameters usable to control one or more actuator of a fuel cell circuit according to an embodiment of the present invention.
Figure 9B:
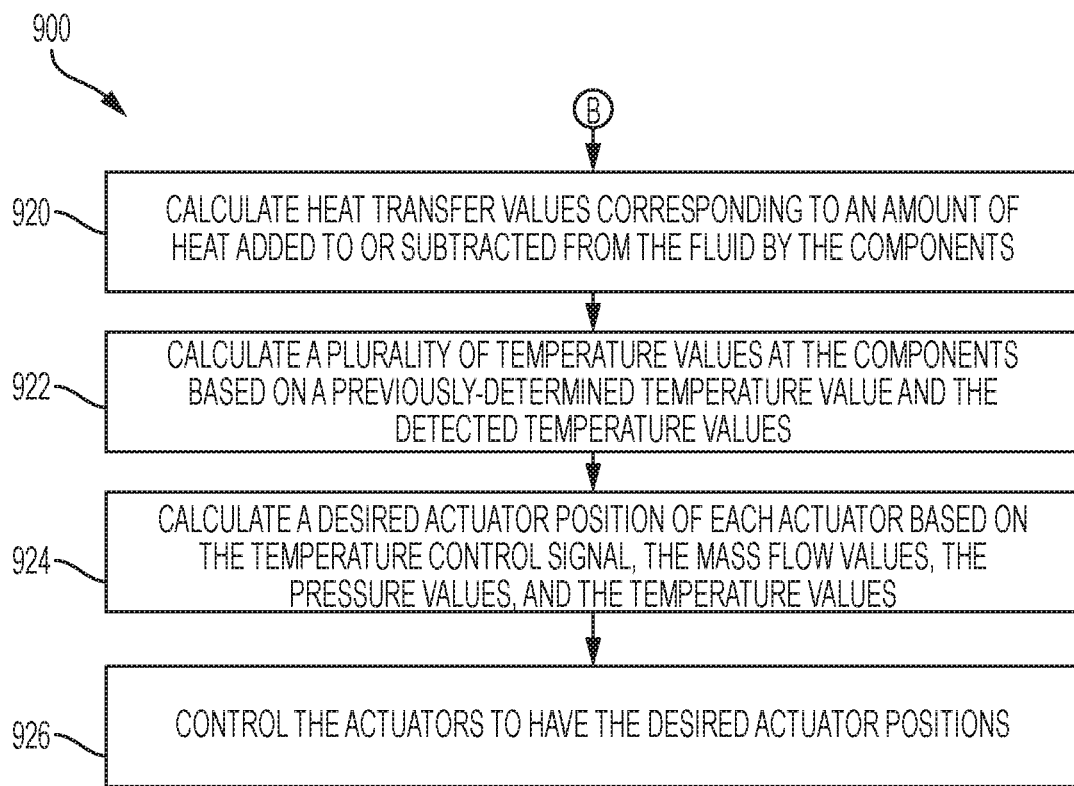

Referring now to FIGS. 9A and 9B, a method 900 for heating or cooling a fuel cell circuit by estimating current conditions of the fuel cell circuit is shown. The method may be performed, for example, by a state estimator of an ECU such as the state estimator 320 of the ECU 102 of FIG. 3.

In block 902, a model of the fuel cell circuit may be created and stored. The model may be created by designers of the fuel cell circuit and may be stored in a memory of the vehicle that is accessible by the ECU. The ECU may use the model of the fuel cell circuit to estimate various temperatures, pressures, and the like throughout the various components of the fuel cell circuit.

Figure 10:
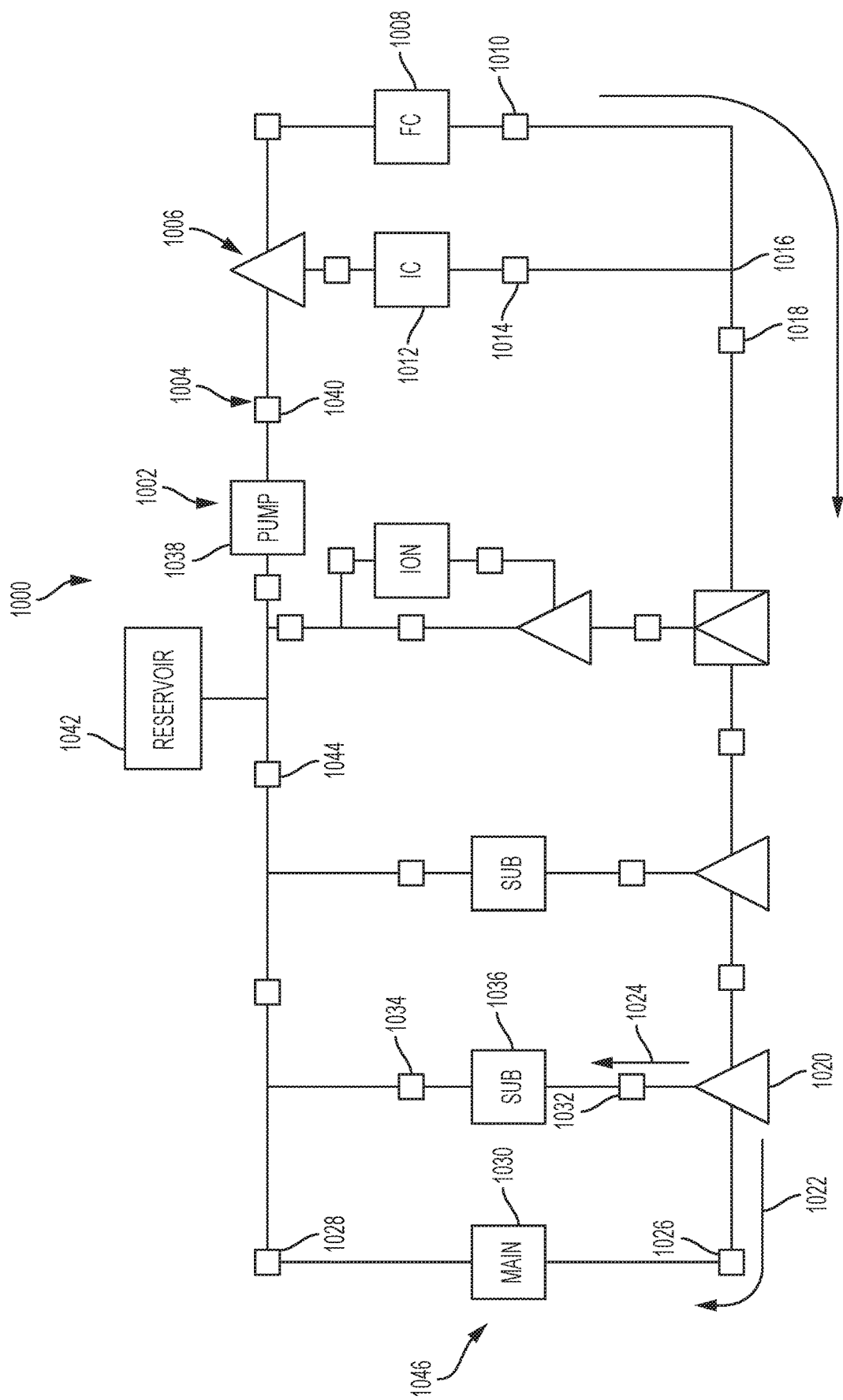
FIG. 10 is a block diagram illustrating a model of a fuel cell circuit used by the method of FIGS. 9A and 9B to estimate the parameters according to an embodiment of the present invention.

Referring briefly to FIG. 10, a model 1000 of a fuel cell circuit, such as the fuel cell circuit 118 of FIG. 2, is shown. The model 1000 may include representations of the main components 1002 (represented by large squares), representations of pipes 1004 (represented by small squares) that connect the main components 1002, and representation of flow splitters 1006 (represented by triangles) in which the flow of fluid is split into two or more flows.

Returning reference to FIGS. 9A and 9B, the ECU may receive a plurality of inputs in block 904. The inputs may include detected temperature values including temperatures detected by temperature sensors along with actuator control signals. The actuator control signals may correspond to commanded actuator values of the actuators (including a pump, a three-way valve, and a radiator fan).

In block 906, the ECU may determine a temperature control signal that corresponds to a desired temperature of the fluid. For example, the temperature control signal may correspond to a temperature rate of change determined by a state governor.

In block 908, the ECU may calculate flow resistance values of components of the fuel cell circuit, and in block 910 the ECU may calculate mass flow values of the fluid through the components of the fuel cell circuit. The flow resistance values and the mass flow values may be calculated for each component including the main components and pipes.

The flow resistance value for each component may be calculated using an equation similar to equation 7 below.

$$Z = \frac{Fd(\text{Length} + \text{Length}_{Add})}{4DA^2\rho} \qquad \text{Equation 7}$$

In equation 7, Z represents the flow resistance. Fd corresponds to a Darcy friction factor of the component, which may be calculated from experimental correlations corresponding to the relevant flow regime (such as whether the flow is turbulent, laminar, etc.), which may be dictated by a corresponding Reynolds number. The Darcy friction factor may indicate an amount of friction loss through the component. Length represents a length of the component. $\text{Length}_{add}$ corresponds to a tuning parameter which may be adjusted by the ECU during operation of the fuel cell circuit, or by designers of the ECU, to increase in accuracy of the calculation for the flow resistance. The $\text{Length}_{add}$ parameter may be adjusted until the flow resistance curve is substantially equal to an empirical curve. D represents a hydraulic diameter of the component, and A represents a cross-sectional area of the component. ρ represents density of the fluid within the component. In equation 7, Fd and ρ are variable parameters, and the remaining parameters remain constant over time.

The mass flow for a given component may be calculated using an equation similar to equation 2 described above.

Referring again to FIG. 10, due to the law of conservation of mass, mass flow of the fluid through components connected adjacently in series will be the same. For example, a fuel cell stack 1008 and a pipe 1010 are connected in series. Thus, all of the fluid that flows through the fuel cell stack 1008 will subsequently flow through the pipe 1010 without becoming separated. In that regard, the mass flow of the fluid through the fuel cell stack 1008 will be equal to the mass flow of the fluid through the pipe 1010. Similarly, the mass flow of the fluid through an intercooler 1012 will be equal to the mass flow of the fluid through another pipe 1014.

When fluid from multiple components join together, such as at a junction 1016, the mass flow after the junction (i.e., through a subsequent component, such as a pipe 1018) will be equal to a sum of the mass flow through the components. In that regard, the mass flow of the fluid through the pipe 1018 will be equal to a sum of the mass flow through the first pipe 1010 and the mass flow through the second pipe 1014.

Figure 11:
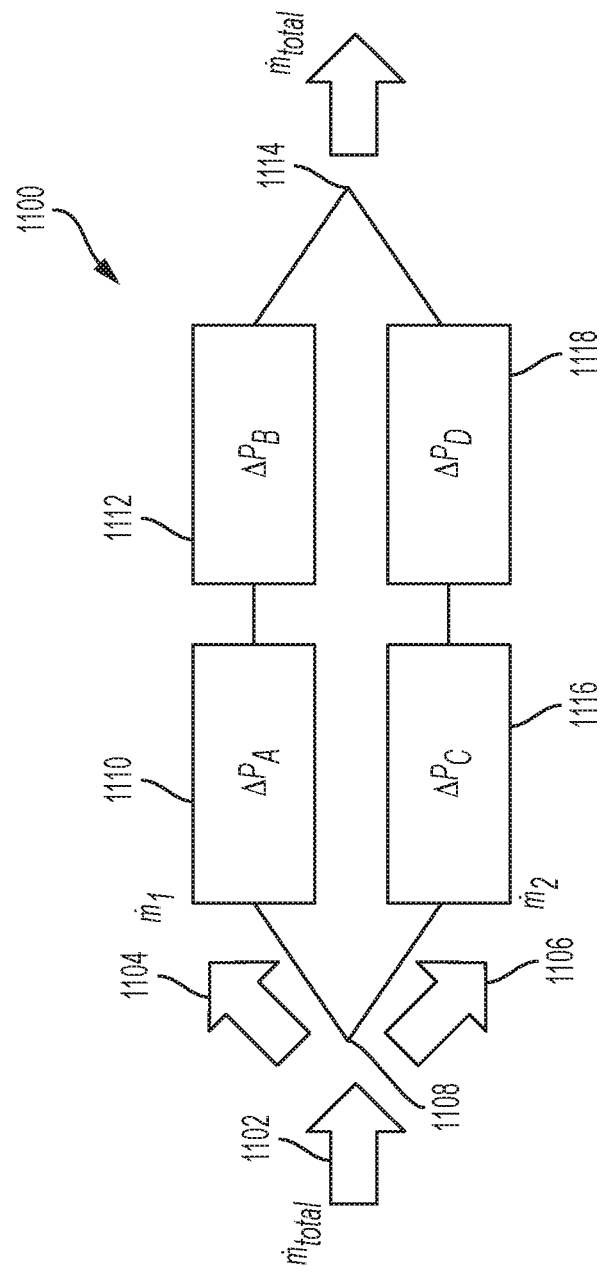
FIG. 11 is a block diagram illustrating an exemplary flow splitting element of a fuel cell circuit according to an embodiment of the present invention.

The calculation for mass flow, however, becomes more challenging for locations in which the flow of the fluid is split (i.e., where components are connected in parallel). For example and referring to FIGS. 10 and 11, a diagram 1100 illustrates an exemplary flow splitting situation. The diagram 1100 includes a main flow path 1102 that splits into a first flow path 1104 and a second flow path 1106 at a flow splitter 1108. The first flow path 1104 flows through a first component 1110 and a second component 1112 before rejoining with the second flow path 1106 at a junction 1114. The second flow path 1106 flows through a third component 1116 and a fourth component 1118 before rejoining with the first flow path 1104 at the junction 1114.

The diagram 1100 may loosely represent a portion of the model 1000 including a flow splitter 1020 (represented by the flow splitter 1108), a first flow path 1022 and a second flow path 1024. The first flow path 1022 includes two pipes 1026, 1028 and a main radiator 1030, and the second flow path 1024 includes two pipes 1032, 1034 and a secondary radiator 1036. As shown, the model 1000 of the fuel cell circuit includes multiple compound flow splits and parallel branches that include multiple components connected in series.

When solving for the mass flows and flow resistances of the model 1000, the flow resistances of one or more component may be known, and the mass flow may be known for at least one component (such as a pump 1038). Because the mass flow is known for one component the mass flow will remain the same for each subsequent component before reaching a flow splitter. In that regard, the mass flow of the fluid through another pipe 1040 will be equal to the mass flow of the fluid through the pump 1038.

When the fluid reaches a flow splitter, additional calculations may be performed to calculate equivalent flow resistances of combinations of components as well as mass flows through each branch. The mass flow ($\dot{m}_{total}$) of the main flow path 1102 may be known (i.e., it may be set to be equal to the mass flow through a previous series component). Likewise, flow resistances of the components 1110, 1112, 1116, 1118 may be known.

In order to calculate equivalent flow resistances, equations 8 and 9 below may be used.

$$Z_{eq\,series} = Z_1 + Z_2 \qquad \text{Equation 8}$$

$$Z_{eq\,parallel} = \frac{z_4}{\left(1 + \sqrt{\frac{z_3}{z_4}}\right)^2} \qquad \text{Equation 9}$$

Equation 8 may be used to calculate equivalent flow resistance for components connected in series. In that regard, an equivalent flow resistance through the first flow path 1104 may be equal to a sum of the flow resistance ($Z_1$) of the first component 1110 and the flow resistance ($Z_2$) of the second component 1112.

Equation 9 may be used to calculate equivalent flow resistance for components connected in parallel. For example, the equivalent flow resistance through the first flow path 1104 ($Z_3$) and through the second flow path 1106 ($Z_4$) may be known. In that regard, an equivalent flow resistance corresponding to a flow resistance through all of the components 1110, 1112, 1116, 1118 may be calculated using equation 9.

In order to calculate mass flow ($\dot{m}_1$) through the first flow path 1104 and mass flow ($\dot{m}_2$) through the second flow path 1106, equations 10 and 11 below may be used.

$$\dot{m}_1 = \frac{\dot{m}_{total}}{1 + \sqrt{\frac{Z_3}{Z_4}}} \qquad \text{Equation 10}$$

$$\dot{m}_2 = \dot{m}_{total} - \dot{m}_1 \qquad \text{Equation 11}$$

Equation 10 may be calculated to determine the mass flow ($\dot{m}_1$) of the fluid through the first flow path 1104. $Z_3$ represents the equivalent flow resistance of the components 1110, 1112 of the first flow path 1104, and $Z_4$ represents the equivalent flow resistance of the components 1116, 1118 of the second flow path 1106. However, $Z_3$ and $Z_4$ are unknown values at the current timestep. In that regard, equation 10 is to be solved using $Z_3$ and $Z_4$ from a previous time period. Because calculations are performed at relatively short intervals (such as between 1 millisecond (ms) and 1 second, or between 5 ms and 50 ms, or about 16 ms), the equivalent flow resistances are unlikely to significantly vary between subsequent time periods. In that regard, solving equation 10 using the equivalent flow resistances from a previous time period is likely to provide a relatively accurate mass flow value. It is desirable to use the equivalent flow resistances from the previous timestep due to the fact that neither the current flow resistances nor the current mass flow values are known, and the fact that a mass flow value is necessary to solve for equivalent flow resistance (and vice versa, per Equation 7). Using the equivalent flow resistances from the previous timestep provides the advantage of allowing the ECU to dynamically solve for the flow split in any branch in real time. In some embodiments, a tool called a "real time iterative solver" may be used to solve the set of equations in real time.

Once the mass flow ($\dot{m}_1$) through the first flow path 1104 is calculated using equation 10, the mass flow ($\dot{m}_2$) through the second flow path 1106 may be calculated using equation 11 by subtracting the mass flow ($\dot{m}_1$) through the first flow path 1104 from the total mass flow ($\dot{m}_{total}$).

After calculating the mass flow values, equations 8 through 11 may be calculated again to determine flow resistances for the current time period. These calculations may be made using the mass flow values calculated based on the flow resistances of the previous time period.

Returning reference to FIGS. 9A, 9B, and 10, the ECU may determine a reservoir pressure of fluid within a reservoir 1042 of the fuel cell circuit in block 912. The reservoir 1042 may be a reservoir that contains fluid to be added to the fuel cell circuit. In some embodiments, the reservoir 1042 may include a port that allows a user of a corresponding vehicle to provide the fluid, such as a coolant. The reservoir pressure may be determined based on sensor data or may be calculated by the ECU.

In block 914, the ECU may calculate pressure values for each of the components of the fuel cell circuit based on the reservoir pressure and the mass flow values calculated in block 910. In particular, a pressure drop across each component of the fuel cell circuit may be calculated using equation 12 below.

$$\Delta P = \dot{m}^2 Z \qquad \text{Equation 12:}$$

In equation 12, $\Delta P$ represents the pressure drop over a given component, such as the pipe 1040. $\dot{m}$ represents the mass flow of the fluid through the given component, and $Z$ represents the flow resistance of the component. In that regard, equation 12 may be used to calculate the pressure drop over each component of the fuel cell circuit.

The pump 1038 may operate as both a pressure source and a mass flow source. In some embodiments, the pump 1038 may be a turbo style pump, meaning that the pump speed, mass flow through the pump 1038, and pressure values are coupled. Thus, a previous timestep total system pressure drop value may be used, along with a current timestep pump speed, to calculate or estimate a current timestep total mass flow (i.e., mass flow through the pump 1038).

After the reservoir pressure and the pressure drop over each component of the fuel cell circuit are known, the pressures at the inlets and outlets of each component may be calculated. For example, the pressure at an outlet of a pipe 1044 is equal to the reservoir pressure because the outlet of the pipe 1044 and the reservoir 1042 are directly connected. Because the pressure drop over the pipe 1044 is known, the pressure at the inlet of the pipe 1044 may be calculated by adding the pressure drop over the pipe 1044 to the reservoir pressure. This calculation may continue around the fuel cell circuit until the pressure at each node of the fuel cell circuit is determined.

In block 916, density values of the fluid through each of the components may be calculated. For example, the density values may be calculated using an equation similar to equation 7 above.

In block 918, specific heat values may be calculated for the fluid in each of the components. For example, the specific heat values may be calculated using an equation similar to equation 2 above.

In block 920, heat transfer values may be calculated for each of the components of the fuel cell circuit. The heat transfer values may correspond to an amount of heat that is added to, or subtracted from, the fluid by the given component. As described above, the intercooler 1012 and the fuel cell stack 1008 are the two components which add heat to the fluid. The heat transfer value ($Q_{FC}$) of the fuel cell stack 1008 may be calculated or estimated using an equation, such as equation 2 above. The heat transfer value of the intercooler 1012 may be calculated using a similar or other equation.

The radiators 1046 and each of the pipes 1004 may each remove heat from the fluid. The heat transfer value of each of the radiators 1046 of the fuel cell circuit may be calculated using equations, such as equations 3 through 6 described above. The heat transfer value of each of the pipes 1004 may be estimated based on the convection properties of the pipes 1004, the temperature of the fluid, and the ambient temperature outside of the pipes 1004.

In block 922, the ECU may calculate a plurality of temperature values corresponding to the components of the fuel cell circuit. For example, the ECU may calculate temperature values at the outlets of the components. Due to the conservation of energy laws, a temperature at an outlet of the first component will be equal to a temperature at an inlet of an adjacent downstream component. The temperature values may be calculated using a temperature value from a previous time period. The temperature values may be calculated using an equation similar to equation 13 below.

$$T_{k+1} = x_{k+1} - e^{\frac{-\Delta t}{\tau}} [x_{k+1} - T_k] \qquad \text{Equation 13}$$

In equation 13, $T_{k+1}$ represents the temperature of the fluid at an outlet of the corresponding component at a current time period. $T_k$ represents the temperature of the fluid at a previous time period which may have been previously calculated. $\Delta t$ represents a length of the time period (such as between 1 ms and 1 second, or between 5 ms and 50 ms, or about 16 ms). $\tau$ represents a time constant and is equal to $$\frac{\rho V}{\dot{m}},$$

where $\rho$ represents density of the fluid within the component, V represents volume of the fluid within the component, and $\dot{m}$, represents mass flow of the fluid through the component. $x_{k+1}$ represents an independent variable, the value of which is calculated for the current time period.

In particular, $x_{k+1}$ may be provided as $$\left[T_1 + \frac{1}{\rho C}(P_1 - P_2) - \frac{1}{c\dot{m}}(Q)\right].$$

$T_1$ represents a temperature at an inlet of the component. $\rho$ represents density of the fluid within the component, and c represents specific heat of the fluid within the component. $P_1$ represents a pressure of the fluid at an inlet of the component, and $P_2$ represents a pressure of the fluid at an outlet of the component. $\dot{m}$ represents mass flow of the fluid through the component. Q represents the heat transfer value of the component and may be obtained from the calculation performed in block 920.

Equation 13 may be performed by the ECU at each time period for each of the components. Because the temperature is known (from temperature sensors) for at least one component of the fuel cell circuit (such as an outlet of the fuel cell stack 1008), this temperature may be used as an input for solving an outlet temperature of an adjacent downstream component (such as an inlet temperature of the pipe 1010). Once the outlet temperature of the adjacent downstream component is calculated, the outlet temperature may be computed or calculated for the next component, and so forth, until the outlet temperature is known for each component of the fuel cell circuit.

In block 924, the ECU may calculate a desired actuator position of each actuator of the fuel cell circuit. As described above, the actuators may include a radiator fan, a pump, and a three-way valve. For example, a feedforward control or a feedback control of the ECU may calculate the desired actuator positions based on the temperature control signal and the values calculated by the state estimator, such as the mass flow values, the pressure values, and the temperature values.

In block 926, the ECU may control the actuators to have the desired actuator position.

Figure 12A:
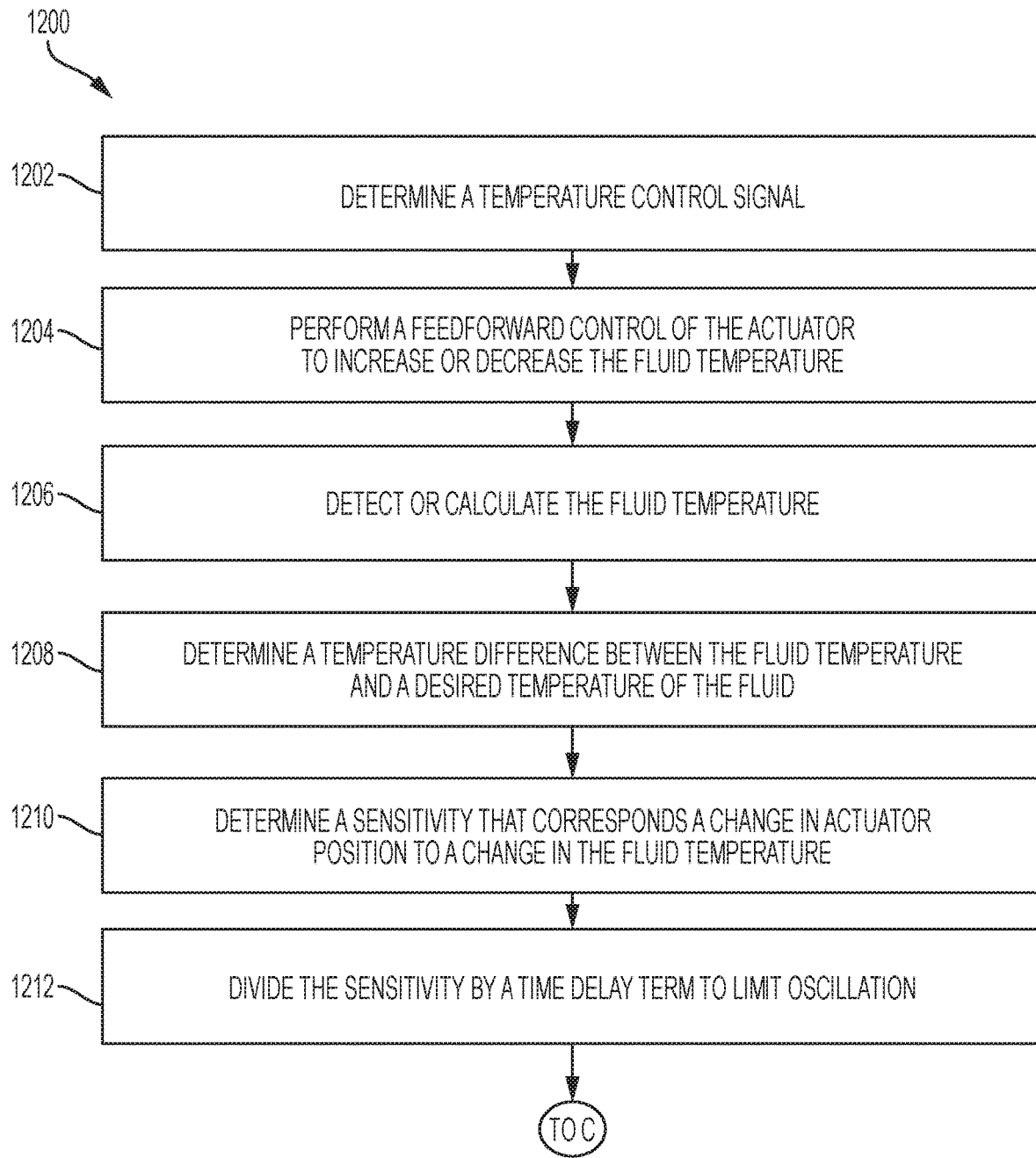
FIGS. 12A and 12B are flowcharts illustrating a method for feedback based heating or cooling of a fuel cell circuit according to an embodiment of the present invention.
Figure 12B:
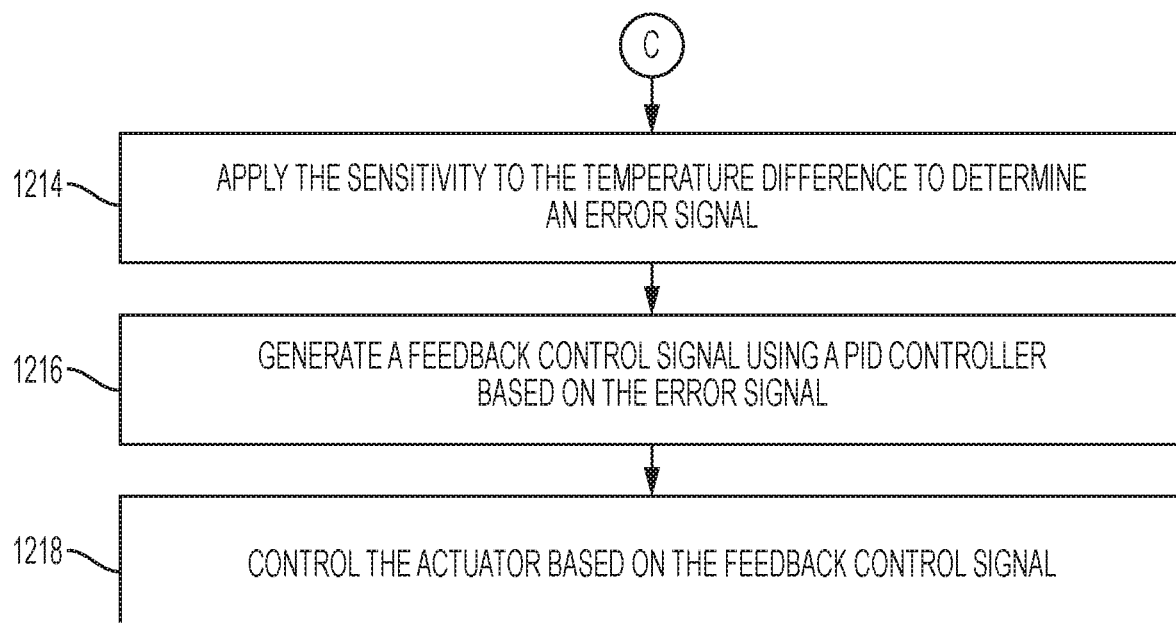

Referring now to FIGS. 12A and 12B, a method 1200 for feedback based heating or cooling of a fuel cell circuit is shown. The method 1200 may be performed by a feedback control, such as the feedback control 316 of FIG. 3.

In block 1202, the ECU may determine a temperature control signal corresponding to a desired temperature of the fluid in the fuel cell circuit. For example, the temperature control signal may correspond to a desired temperature of the fluid and may include, for example, a temperature rate of change. In some embodiments, the temperature control signal may be determined based on a desired temperature of the fluid at one or more location. The temperature control signal may be determined using a state governor such as the state governor 308 of FIG. 3.

In block 1204, the ECU may perform a feedforward control of the actuator in order to increase or decrease the fluid temperature based on the temperature control signal. For example, the ECU may determine a feedforward control signal using a feedforward control such as the feedforward control 312 of FIG. 3. The feedforward control may be based on the temperature control signal and estimated values that were calculated using a state estimator. In some embodiments, the ECU may directly control one or more actuator of the fuel cell circuit using the feedforward control. In some embodiments, the ECU may directly control one or more actuator using a combination of the feedforward control and feedback control.

In block 1206, the fluid temperature of the fluid at one or more location may be detected by a temperature sensor or calculated by the ECU, such as in a state estimator.

In block 1208, the ECU may determine a temperature difference between the detected or calculated fluid temperature and a desired temperature of the fluid at one or more location. For example, the ECU may determine a temperature difference between a detected or calculated temperature at an outlet of the fuel cell stack and a desired temperature of the fluid at the outlet of the fuel cell stack.

In block 1210, the ECU may determine or calculate a sensitivity. The sensitivity may correspond or associate a change in actuator position (including a physical change in actuator position, a change in an actuator control signal, or a change in parameter value used to determine the actuator control signal) to a change in the fluid temperature. For example, the sensitivity may indicate how much change in an actuator position of an actuator changes the fluid temperature of the fluid by 1 degree. As another example, the sensitivity may indicate how much a change in mass flow changes the fluid temperature of the fluid by 1 degree.

In some embodiments and in block 1212, the ECU may divide the sensitivity by a time delay. This may be especially useful if the fluid temperature of the fluid is detected by a sensor. This is because the fluid temperature detected by a sensor may be delayed by one or more seconds, such as 1 to 5 seconds. In that regard, if control of the actuator is based on a time delayed sensor reading, the actuator control may oscillate due to the delayed reading. Dividing the sensitivity by the time delay results in a more gradual change in the actuator control, thus reducing the likelihood of oscillation of the actuator control.

In some embodiments, especially if the fluid temperature is calculated by the ECU rather than detected by a sensor having a time delay, block 1212 may be avoided. This is because the calculation of the fluid temperature may have a relatively small delay, if any delay at all. Therefore, the actuator control may be based on a more current reading such that the time delay operation is unnecessary.

The temperature difference determined in block 1208 may correspond to a temperature error. Stated differently, the temperature difference corresponds to an error because it is the difference between a desired temperature at the location and the actual temperature at the location. In that regard and in block 1214, the sensitivity may be applied to the temperature difference in order to determine an error signal. The error signal may correspond to, or indicate, an error in the actuator position or an error in the parameter used to calculate the actuator position that caused the temperature difference. For example, the error signal may indicate that a pump is pumping the fluid through the fuel cell circuit at a mass flow rate that is either too low or too high. The error signal may further indicate or correspond to a difference in mass flow that will cause the actual temperature of the fluid to be relatively equal to the desired temperature of the fluid.

In block 1216, the ECU may pass the error signal through a proportional-integral-derivative (PID, or PI) controller to generate a feedback control signal. The PID controller may analyze past and present values of the error signal and generate the feedback control signal based on present error values, past error values, and potential future errors of the error signal.

In block 1218, the ECU may control the actuator based on the feedback control signal. For example, the ECU may generate a sum of the feedforward control signal (such as a control signal generated using the method 800 of FIGS. 8A and 8B) and the feedback control signal and control the actuator based on the sum. In some embodiments, the ECU may control the actuator based on the feedback control signal alone.

Figure 13:
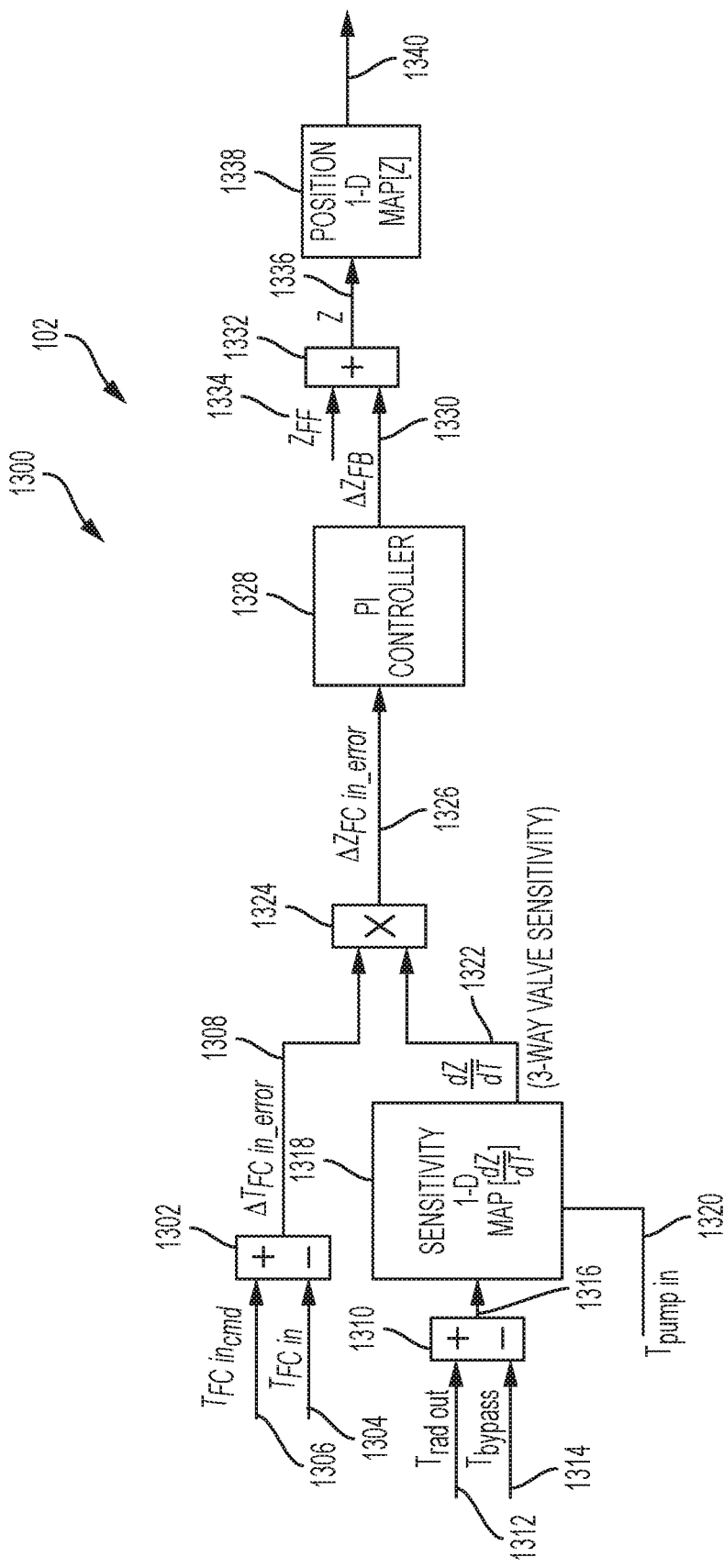
FIG. 13 is a block diagram illustrating a three-way valve controller for feedback based control of a three-way valve of a fuel cell circuit according to an embodiment of the present invention.

Referring now to FIG. 13, the ECU 102 of FIG. 2, and in particular the feedback control 316, may include a three-way valve controller 1300. The three-way valve controller 1300 may include logic or dedicated hardware designed to perform a method similar to the method 1200 of FIGS. 12A and 12B to perform feedback control of the three-way valve.

The three-way valve controller 1300 may include a difference block 1302. The difference block 1302 may receive a fluid temperature 1304 measured or calculated at the inlet of the fuel cell stack. For example, the fluid temperature 1304 may be calculated by a state estimator of the ECU 102. The difference block 1302 may further receive a desired temperature 1306 corresponding to a desired temperature of the fluid at the inlet of the fuel cell stack. The difference block 1302 may output a temperature difference 1308 corresponding to a difference between the fluid temperature 1304 and the desired temperature 1306.

The three-way valve controller 1300 may further include a second difference block 1310. The second difference block 1310 may receive a radiator temperature 1312 corresponding to a temperature of the fluid at the outlet of the radiator. The second difference block 1310 may further receive a bypass fluid temperature 1314 corresponding to a temperature of the fluid at a location along a bypass branch of the fuel cell circuit. The second difference block 1310 may output a difference 1316 between the radiator temperature 1312 and the bypass fluid temperature 1314.

The three-way valve controller 1300 may further include a sensitivity block 1318. The sensitivity block 1318 may receive the difference 1316 between the radiator temperature 1312 and the bypass fluid temperature 1314 along with a pump fluid temperature 1320 corresponding to a temperature of the fluid at an inlet of the pump. The sensitivity block 1318 may determine a sensitivity 1322 that corresponds a change in valve position of the three-way valve to a change in fluid temperature of the fluid, such as a fluid temperature at the inlet of the fuel cell stack. For example, the sensitivity 1322 may indicate how much of a change in valve position (Z) results in a 1 degree change of the fluid temperature at the inlet of the fuel cell stack.

The sensitivity 1322 may be calculated using an equation similar to equation 14 below. In some embodiments, the sensitivity may be provided as a lookup table or lookup map that is populated using an equation similar to equation 14. In some embodiments, the sensitivity may be provided, as the equation such that the sensitivity block 1318 calculates the sensitivity based on the received inputs.

$$\frac{dZ}{dT} = \frac{\left(\frac{((T_{pump\ in} + \Delta T_{(1C)}) - T_{bypass})}{(T_{rad\ out} - T_{bypass})}\right) - \left(\frac{(T_{pump\ in} - T_{bypass})}{(T_{rad\ out} - T_{bypass})}\right)}{\Delta T_{(1C)}}$$

Equation 14

In equation 14, $$\frac{dZ}{dT}$$

represents the sensitivity 1322 that is determined or calculated by the sensitivity block 1318. $T_{pump\ in}$ represents the pump fluid temperature 1320. $\Delta T$ represents a set change in the fluid temperature at the inlet of the fuel cell stack. In some embodiments, $\Delta T$ is set to be equal to 1 degree C. $T_{bypass}$ represents the bypass fluid temperature 1314, and $T_{rad\ out}$ represents the radiator temperature 1312 at the outlet of the radiator. The sensitivity $$\frac{dZ}{dT}$$

indicates how much the fluid split ratio of the three-way valve must change in order to achieve a predefined temperature change (such as 1 degree C.) of the fluid at the inlet of the fuel cell stack.

As described above with reference to FIGS. 8A and 8B, the fluid split ratio may correspond to a ratio of an amount of fluid (e.g., measured using mass flow) that is directed towards the radiators to a total amount of fluid (e.g., measured using mass flow) flowing through the entire fuel cell circuit. Thus, a fluid split ratio of 1 may indicate that all of the fluid is flowing through the radiators and none through the bypass branch. Furthermore and also as described above with reference to FIGS. 8A and 8B, the fluid split ratio of the three-way valve (Z) is a function of a difference between the radiator temperature 1312 at the outlet of the radiator and the bypass fluid temperature 1314.

The three-way valve controller 1300 may further include a multiplication block 1324. The multiplication block 1324 may apply the sensitivity 1322 to the temperature difference 1308. For example, the multiplication block 1324 may multiply the temperature difference 1308 by the sensitivity 1322. The result of the multiplication block 1324 may be an error signal 1326, and may indicate an error in the three-way valve position (measured, for example, in values corresponding to the fluid split ratio).

The three-way valve controller 1300 may further include a proportional integral derivative (PID) controller 1328. The PID controller 1328 may receive the error signal 1326 and may generate a feedback control signal 1330 by accounting for present error values, past error values, and potential future errors of the error signal 1326.

The ECU 102 may further include a combination block 1332 that receives the feedback control signal 1330 along with a feedforward control signal 1334. The feedforward control signal 1334 may correspond to a feedforward control of the three-way valve as determined or calculated by a feedforward control such as the feedforward control 312 of FIG. 3.

The combination block 1332 may generate a sum of the feedback control signal 1330 and the feedforward control signal 1334. The combination block 1332 may output a combined control signal 1336 that corresponds to a final desired valve position based on feedforward and feedback control. In particular, the combined control signal 1336 may correspond to a final desired fluid split ratio.

The combined control signal 1336 may be received by a lookup table 1338. In some embodiments, the lookup table 1338 may instead include a calculation or other method or apparatus for converting a fluid split ratio to a desired valve position. In that regard, the lookup table 1338 may receive the combined control signal 1336, and may convert the combined control signal 1336 into a final desired valve position 1340, and may output the final desired valve position 1340. The ECU may control the three-way valve based on the final desired valve position 1340.

Figure 14:
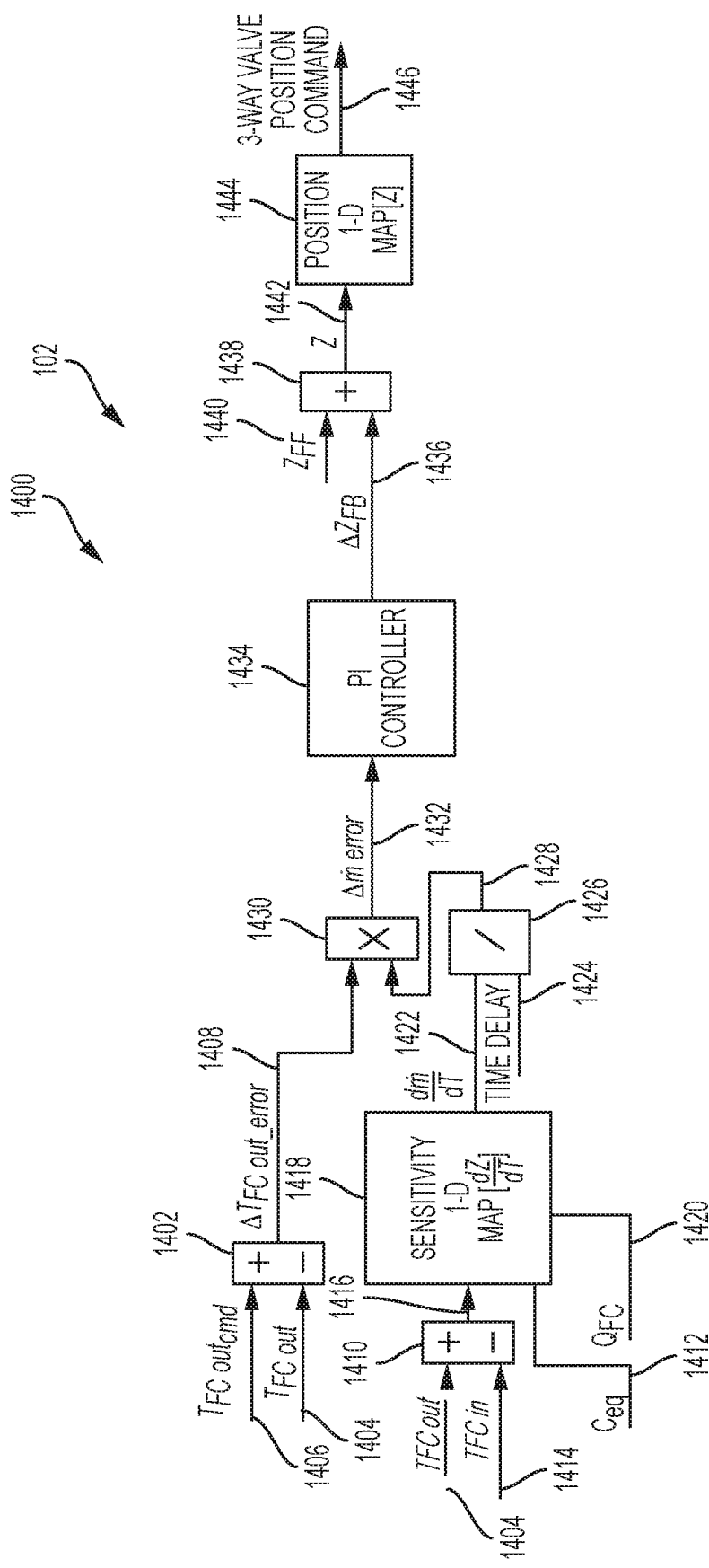
FIG. 14 is a block diagram illustrating a pump controller for feedback based control of a pump of a fuel cell circuit according to an embodiment of the present invention.

Referring now to FIG. 14, the ECU 102 of FIG. 2, and in particular the feedback control 316, may include a pump controller 1400. The pump controller 1400 may be implemented as logic or dedicated hardware and designed to perform a method similar to the method 1200 of FIGS. 12A and 12B to perform feedback control of the pump.

The pump controller 1400 may include a difference block 1402. The difference block 1402 may receive a fluid temperature 1404 measured or calculated at the outlet of the fuel cell stack. For example, the fluid temperature 1404 may be measured by a temperature sensor, such as the temperature sensor 224 of FIG. 2, or may be calculated by a state estimator of the ECU 102. The difference block 1402 may further receive a desired temperature 1406 corresponding to a desired temperature of the fluid at the outlet of the fuel cell stack. For example, the desired temperature 1406 may correspond to a commanded temperature of the fluid at the outlet of the fuel cell stack and may be determined by an upper controller of the ECU 102. The difference block 1402 may output a temperature difference 1408 corresponding to a difference between the fluid temperature 1404 and the desired temperature 1406.

The pump controller 1400 may further include a second difference block 1410. The second difference block 1410 may receive the fluid temperature 1404 and a fuel cell inlet temperature 1414 corresponding to a temperature of the fluid at the inlet of the fuel cell stack. The fuel cell inlet temperature 1414 may be measured or calculated by a state estimator of the ECU 102. The second difference block 1410 may output a difference 1416 between the fluid temperature 1404 and the fuel cell inlet temperature 1414. The difference 1416 may also be referred to as a temperature gradient of the fuel cell stack as it corresponds to a temperature difference between the inlet and the outlet of the fuel cell stack.

The pump controller 1400 may further include a sensitivity block 1418. The sensitivity block 1418 may receive the difference 1416 along with an amount of heat 1420 output by the fuel cell stack (corresponding to an amount of heat transferred from the fuel cell stack to the fluid) and an equivalent specific heat 1412 of the fluid in the fuel cell stack. The sensitivity block 1418 may determine a sensitivity 1422 that corresponds a change in pump output (such as a change in mass flow of the fluid) of the pump to a change in fluid temperature of the fluid, such as a fluid temperature at the outlet of the fuel cell stack. For example, the sensitivity 1322 may indicate how much of a change in mass flow output by the pump corresponds to a 1 degree change of the fluid temperature at the outlet of the fuel cell stack.

The sensitivity 1422 may be calculated using an equation similar to equation 15 below. In some embodiments, the sensitivity may be provided as a lookup table or lookup map that is populated using an equation similar to equation 15. In some embodiments, the sensitivity may be provided as the equation such that the sensitivity block 1418 calculates the sensitivity based on the received inputs.

$$\frac{\Delta \dot{m}}{dT_{FC\ out}} = \frac{\frac{-Q_{FC}}{C_{eq}(-(T_{FC\ out} - T_{FC\ in}) + dT_{FC\ out})} - \frac{-Q_{FC}}{C_{eq}(-(T_{FC\ out} - T_{FC\ in}))}}{dT_{FC\ out}} \quad \text{Equation 15}$$

In equation 15, $$\frac{\Delta \dot{m}}{dT_{FC\ out}}$$

represents the sensitivity 1422 that is determined or calculated by the sensitivity block 1418. As shown, the sensitivity 1422 corresponds a change in mass flow output by the pump ($\Delta \dot{m}$) to a change of the fluid temperature at the outlet of the fuel cell stack ($dT_{FC\ out}$). In particular, the sensitivity $$\frac{\Delta \dot{m}}{dT_{FC\ out}}$$

indicates an amount of change of the mass flow output by the pump required to achieve a predefined temperature change (such as 1 degree C.). In some embodiments, $dT_{FC\ out}$ is set to be equal to 1 degree C. $c_{eq}$ represents an equivalent specific heat 1412 of the fluid in the fuel cell stack. $Q_{FC}$ represents the amount of heat 1420 output by the fuel cell stack. $T_{FC\ out}$ represents the fluid temperature 1404 of the fluid at the outlet of the fuel cell stack, and $T_{FC\ in}$ represents the fuel cell inlet temperature 1414 at the inlet of the fuel cell stack.

The pump controller 1400 may further include a division block 1426. The division block 1426 may receive the sensitivity 1422 along with a time delay 1424. The division block 1426 may divide the sensitivity 1422 by the time delay 1424. By performing this division, the division block 1426 reduces the sensitivity 1422 to cause a more gradual change in the pump control. In that regard, the division block 1426 may reduce oscillation of the pump control. This may be useful if the fluid temperature 1406 is detected by a temperature sensor due to the delayed reading of the temperature sensor. In some embodiments, the division block 1426 may be excluded, particularly if the fluid temperature 1406 is calculated by a state estimator of the ECU 102. The division block 1426 may output an adjusted sensitivity 1428. In some embodiments, the three-way valve controller 1300 of FIG. 13 may likewise include a similar division block.

The pump controller 1400 may further include a multiplication block 1430. The multiplication block 1430 may apply the adjusted sensitivity 1428 to the temperature difference 1408. For example, the multiplication block 1430 may multiply the temperature difference 1408 by the adjusted sensitivity 1428. The result of the multiplication block 1430 may be an error signal 1432, indicating an error in the desired mass flow to be output by the pump. In that regard, the error signal may include a mass flow value.

The pump controller 1400 may further include a PID controller 1434. The PID controller 1434 may receive the error signal 1432 and may generate a feedback control signal 1436 by accounting for present error values, past error values, and potential future errors of the error signal 1432.

The ECU 102 may further include a combination block 1438 that receives the feedback control signal 1436 along with a feedforward control signal 1440. The feedforward control signal 1448 may correspond to a feedforward control of the pump as determined or calculated by a feedforward control such as the feedforward control 312 of FIG. 3.

The combination block 1438 may generate a sum of the feedback control signal 1436 and the feedforward control signal 1440. The combination block 1438 may output a combined control signal 1442 that corresponds to a final desired mass flow to be output by the pump based on feedforward and feedback control.

The combined control signal 1442 may be received by a lookup table 1444. In some embodiments, the lookup table 1444 may instead include a calculation or other method or apparatus for converting a mass flow rate to a pump control signal. In that regard, the lookup table 1444 may receive the combined control signal 1442, and may convert the combined control signal 1442 into a final pump control signal 1446. The ECU may control the pump based on the final pump control signal 1446.

Figure 15A:
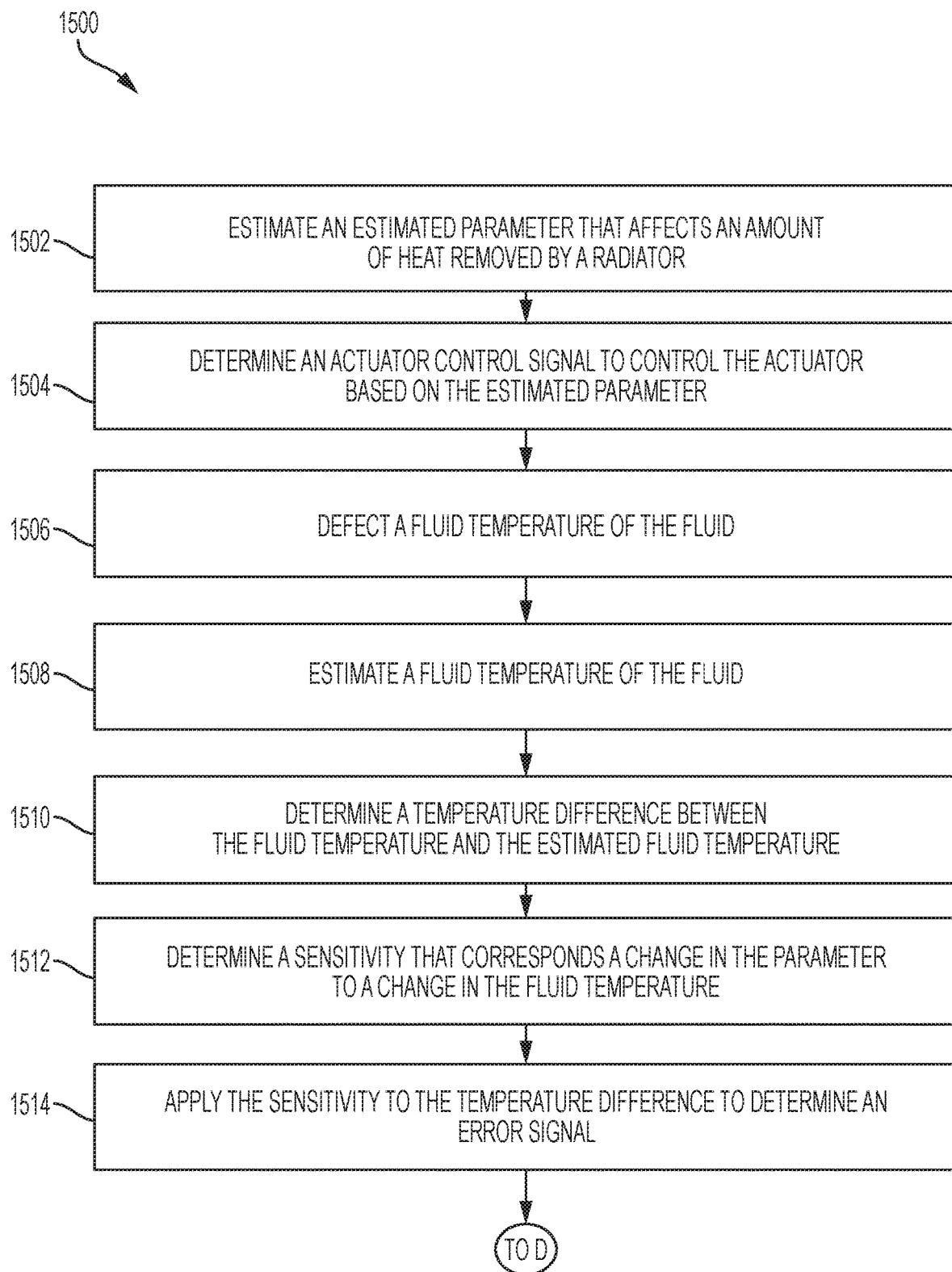
FIGS. 15A and 15B are flowcharts illustrating a method for correcting an estimated parameter that is used to control an actuator of a fuel cell circuit according to an embodiment of the present invention.
Figure 15B:
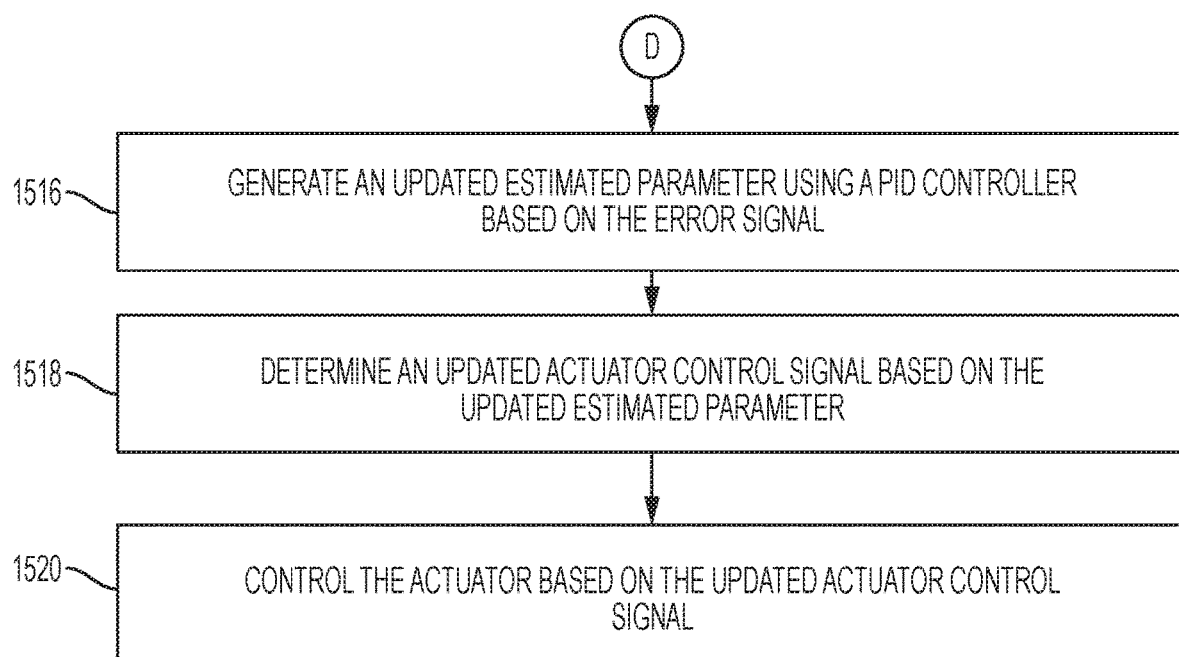

Referring now to FIGS. 15A and 15B, a method 1500 for correcting an estimated parameter is shown. The method 1500 may be performed by components of a fuel cell circuit such as the fuel cell circuit 118 of FIG. 2. For example, the method 1500 may be performed by an observer of an ECU, such as the observer 322 of FIG. 3. The estimated parameter may include an estimated or calculated parameter generated by a state estimator. Correction of the estimated parameter may cause multiple calculations by the state estimator to improve in accuracy due to a trickle-down effect.

In block 1502, the ECU may estimate an estimated parameter that affects an amount of heat removed by a radiator. As described above, a velocity of the ambient air that passes over the radiators may be included in a calculation for the amount of heat removed by the radiator. In that regard, the estimated parameter may include the velocity of the ambient air that flows over one or more radiator. In some embodiments, the estimated parameter may include another value such as a temperature of the ambient air or the like.

In block 1504, the ECU may determine an actuator control signal used to control the actuator. For example, the actuator may include the fan such that the control signal corresponds to a fan speed of the fan or a power signal for powering the fan. The ECU may determine the actuator control signal in a feedforward control such as the feedforward control 312 of FIG. 3.

In block 1506, a temperature sensor may detect a fluid temperature of the fluid within the fuel cell circuit. For example, the fluid temperature may be detected at an outlet of one or more radiator, such as by the temperature sensor 226 of the fuel cell circuit 118 of FIG. 2.

In block 1508, the ECU may estimate an estimated fluid temperature of the fluid. For example, the estimated fluid temperature may be estimated for the same location at which the fluid temperature was detected in block 1506 (i.e., the outlet of the radiators). The ECU may estimate the estimated fluid temperature using a state estimator, such as the state estimator 320 of FIG. 3.

In block 1510, the ECU may calculate or determine a temperature difference between the fluid temperature that was detected in block 1506 and the estimated fluid temperature that was calculated in block 1508. In that regard, the temperature difference may indicate an error or a miscalculation by the state estimator as it represents a difference between the measured temperature and the temperature estimated by the state estimator.

In block 1512, the ECU may determine or calculate a sensitivity. The sensitivity may correspond or associate a change in the estimated parameter to a change in the fluid temperature. Because the estimated parameter is used to determine the control signal for the fan, a change in the estimated parameter ultimately affects an amount of heat removed from the fluid by the radiators. For example, the sensitivity may indicate how much change in the estimated parameter is needed to cause the fluid temperature to change by 1 degree C. In some embodiments, the fluid temperature may be measured or calculated at the outlet of the radiators.

In block 1514, the ECU may apply the sensitivity to the temperature difference in order to determine an error signal. The error signal may indicate, or correspond to, an error in the estimated parameter that caused the temperature difference. For example, the error signal may indicate that the value of the estimated parameter (e.g., ambient air velocity) calculated by the state estimator is too low or too high. The error signal may further indicate or correspond to a difference in the value of the estimated parameter that will cause the estimated fluid temperature to be substantially equal to the actual fluid temperature of the fluid.

In block 1516, the ECU may pass the error signal through a PID controller to generate an updated estimated parameter. The PID controller may analyze past and present values of the error signal and generate the updated estimated parameter based on present error values, past error values, and potential future error values of the error signal.

In block 1518, the ECU may determine an updated actuator control signal based on the updated estimated parameter. For example, the feedforward control may generate a new fan control signal using the updated estimated parameter rather than the original estimated parameter generated by the state estimator. In that regard, use of the updated estimated parameter is likely to cause the actual temperature of the fluid to be closer in value to a desired temperature of the fluid.

In block 1520, the ECU may control the actuator based on the updated actuator control signal generated in block 1518.

Figure 16:
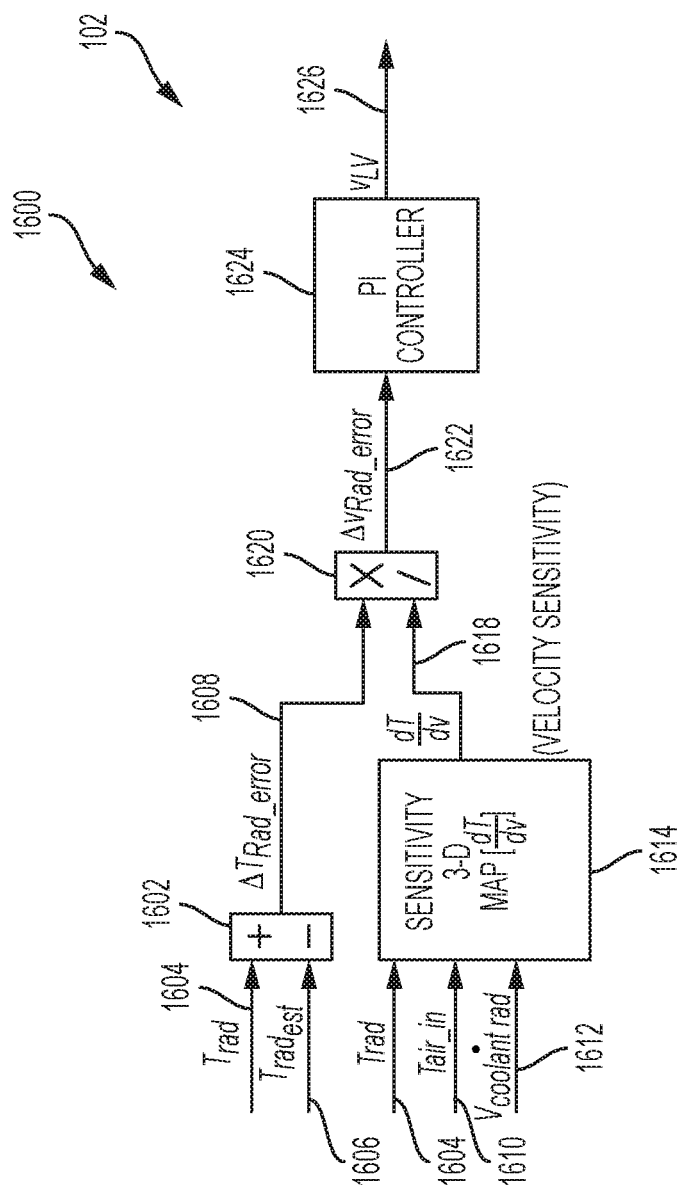
FIG. 16 is a block diagram illustrating an estimated parameter controller for correcting an estimated parameter that is used to control a fan of a fuel cell circuit according to an embodiment of the present invention.

Referring now to FIG. 16, the ECU 102 of FIG. 2, and in particular the observer 322, may include an estimated parameter controller 1600. The estimated parameter controller 1600 may be implemented using logic or dedicated hardware and designed to perform a method similar to the method 1500 of FIGS. 15A and 15B to update a parameter estimated by the state estimator.

The estimated parameter controller 1600 may include a difference block 1602. The difference block 1602 may receive a fluid temperature 1604 measured at the outlet of the radiators (such as by the temperature sensor 226 of FIG. 2). The difference block 1602 may further receive an estimated fluid temperature 1606 corresponding to a fluid temperature of the fluid at the outlet of the radiators that was calculated by a state estimator. The difference block 1602 may output a temperature difference 1608 corresponding to a difference between the measured fluid temperature 1604 and the estimated fluid temperature 1606. In that regard, the temperature difference 1608 may indicate an error in the calculation of the estimated fluid temperature 1606.

The estimated parameter controller 1600 may further include a sensitivity block 1614. The sensitivity block 1614 may receive the fluid temperature 1604, a temperature 1610 of the ambient air flowing over the radiators, and a specific volumetric flowrate 1612 (e.g., measured in liters per minute) of the coolant (i.e., ambient air) flowing over the radiators. The temperature 1610 and the specific volumetric flowrate 1612 may be estimated or calculated by a state estimator. The sensitivity block 1614 may determine a sensitivity 1618 that corresponds a change in the velocity of the ambient air to a change in fluid temperature of the fluid, such as the fluid temperature 1604 measured at the outlet of the radiators. For example, the sensitivity 1618 may indicate how much change in velocity will result in a 1 degree C. change of the fluid temperature 1604.

The sensitivity 1618 may be calculated using an equation similar to equation 16 below. In some embodiments, the sensitivity may be provided as a lookup table or lookup map that is populated using an equation similar to equation 16. In some embodiments, the sensitivity may be provided as the equation such that the sensitivity block 1614 calculates the sensitivity based on the received inputs.

$$\frac{dT}{dv} = \frac{(\text{Var1} - \text{Var2})}{\Delta v_{(1m/s)}} \qquad \text{Equation 16}$$

In equation 16, $$\frac{dT}{dv}$$

represents the sensitivity 1618. As mentioned above, the sensitivity 1618 may correspond a change in the velocity of ambient air to a predetermined change in temperature (such as 1 degree C.). $\Delta v$ represents a predetermined change in the velocity, such as 1 meter per second (1 m/s). Equation 1 illustrates that the sensitivity 1618 is a function of a temperature of the fluid at the inlet of all radiators ($\text{Trad}_{in}$), the temperature 1610 of the ambient air flowing over all radiators ($\text{Tair\_in}$), and the specific volumetric flowrate 1612 of the coolant (i.e., air) that flows over the corresponding radiator ($\dot{V}_{coolant\ rad}$).

Var1 may be represented $$\text{as}\left(\text{Trad}_{in} - \left(\frac{\left(\text{kf\_MAP}_{main}\left((v_{amb_{air}} + \Delta v_{(1m/s)}), \dot{V}_{coolant\ rad_{main}}\right)\right)}{(\dot{m}_{main}c_{main})}\right. \right.$$
$$\left. + \frac{\left(\text{kf\_MAP}_{sub1}\left((v_{amb_{air}} + \Delta v_{(1m/s)}), \dot{V}_{coolant\ rad_{sub1}}\right)\right)}{(\dot{m}_{sub1}c_{sub1})}\right.$$
$$\left.\left. + \frac{\left(\text{kf\_MAP}_{sub2}\left((v_{amb_{air}} + \Delta v_{(1m/s)}), \dot{V}_{coolant\ rad_{sub2}}\right)\right)}{(\dot{m}_{sub2}c_{sub2})}\right)\right)$$

In Var1, $\text{Trad}_{in}$ represents the fluid temperature at the inlet of all radiators. $\text{kf\_MAP}_{xx}$ represents a lookup table value that is determined using a corresponding kf factor for each of the radiators (one main radiator (main) and two secondary radiators (sub1 and sub2)). $v_{amb_{air}}$ represents the velocity of the ambient air. $\dot{V}_{coolant\ rad_{xx}}$ represents a specific volumetric flowrate of the coolant (i.e., air) that flows over the corresponding radiator. $\text{Trad}_{xx_{in}}$ represents a temperature of the fluid at the inlet of each corresponding radiator. $\text{Tair\_in}_{xx}$ represents a temperature of the air flowing over each corresponding radiator. $\dot{m}_{xx}$ represents the mass flow of the fluid flowing through the corresponding radiator. $c_{xx}$ represents a specific heat of the fluid flowing through the corresponding radiator.

Var2 may be represented as $\left(\text{Trad}_{in} - \right.$ $$\left(\frac{\left(\text{kf\_MAP}_{main}\left(v_{amb_{air}}, \dot{V}_{coolant\ rad_{main}}\right)(\text{Trad}_{main_{in}} - \text{Tair\_in}_{main})\right)}{(\dot{m}_{main}c_{main})} + \right.$$
$$\frac{\left(\text{kf\_MAP}_{sub1}\left(v_{amb_{air}}, \dot{V}_{coolant\ rad_{sub1}}\right)(\text{Trad}_{sub1_{in}} - \text{Tair\_in}_{sub1})\right)}{(\dot{m}_{sub1}c_{sub1})} +$$
$$\left.\left.\frac{\left(\text{kf\_MAP}_{sub2}\left(v_{amb_{air}}, \dot{V}_{coolant\ rad_{sub2}}\right)(\text{Trad}_{sub2_{in}} - \text{Tair\_in}_{sub2})\right)}{(\dot{m}_{sub2}c_{sub2})}\right)\right)$$

The estimated parameter controller 1600 may further include a multiplication block 1620. The multiplication block 1620 may receive the sensitivity 1618 and the temperature difference 1608, and may apply the sensitivity 1618 to the temperature difference 1608. For example, the multiplication block 1620 may multiply or divide the temperature difference 1608 by the sensitivity 1618. The result of the multiplication block 1620 may be an error signal 1622, such as an error in the estimated parameter (i.e., the velocity of the ambient air).

The estimated parameter controller 1600 may further include a PID controller 1624. The PID controller 1624 may receive the error signal 1622 and may generate an updated estimated parameter 1626. The PID controller 1624 may generate the updated estimated parameter 1626 by accounting for present error values, past error values, and potential future errors of the error signal 1622. The ECU 102 may then transfer the updated estimated parameter 1626 to a feedforward control for controlling the fan of the fuel cell circuit.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for heating or cooling a fuel cell circuit of a vehicle comprising:
    a fuel cell stack having a plurality of fuel cells and configured to receive a fluid and to heat the fluid;
    a radiator configured to transfer heat away from the fluid;
    an actuator having an actuator position and configured to increase or decrease a fluid temperature of the fluid, the actuator including at least one of:
        a valve having a valve position configured to adjust an amount of the fluid that flows through the radiator, or a fan having a fan speed and configured to direct air over the radiator at a volume that corresponds to the fan speed;

a pipe configured to facilitate flow of the fluid through the fuel cell circuit;

a non-transitory memory configured to store a model of the fuel cell circuit; and an electronic control unit (ECU) coupled to the actuator and the non-transitory memory and programmed to:
calculate a plurality of mass flow values of the fluid each corresponding to a mass flow of the fluid through the fuel cell stack or the pipe based on a previously-determined mass flow value and the model of the fuel cell circuit, calculate a plurality of pressure values each corresponding to a pressure of the fluid at an inlet or an outlet of the fuel cell stack or the pipe based on the plurality of mass flow values and the model of the fuel cell circuit, receive or calculate a desired temperature of the fluid at a location in the fuel cell circuit that is greater than a present temperature of the fluid at the location, and control the actuator position of the actuator by at least one of adjusting the valve position of the valve to reduce a flow of the fluid through the radiator or decreasing the fan speed of the fan to increase the fluid temperature based on the desired temperature and based on at least one of the plurality of mass flow values and at least one of the plurality of pressure values.

2. The system of claim 1 wherein the ECU is further programmed to:
determine a temperature control signal corresponding to the desired temperature of the fluid at a fuel cell inlet or a fuel cell outlet of the fuel cell stack;
calculate a desired actuator position of the actuator based on the temperature control signal, at least one of the plurality of mass flow values, and at least one of the plurality of pressure values; and
control the actuator position to be equal to the desired actuator position.

3. The system of claim 1 further comprising a flow splitter configured to split the fluid into a first fluid flow and a second fluid flow, wherein:
the pipe includes a first pipe configured to receive the first fluid flow and a second pipe configured to receive the second fluid flow; and
the ECU is further programmed to calculate a first pipe mass flow of the first fluid flow through the first pipe and a second pipe mass flow of the second fluid flow through the second pipe based on previously-determined flow resistances of the first pipe and of the second pipe.

4. The system of claim 1 further comprising a reservoir configured to store the fluid at a reservoir pressure, wherein the ECU is further programmed to identify a current reservoir pressure of the fluid in the reservoir, and calculate the plurality of pressure values further based on the current reservoir pressure.

5. The system of claim 1 wherein the ECU is further programmed to:
calculate a plurality of density values each corresponding to a density of the fluid through the fuel cell stack or the pipe;
calculate a plurality of specific heat values each corresponding to a specific heat of the fluid through the fuel cell stack or the pipe; and
control the actuator position further based on at least one of the plurality of density values and at least one of the plurality of specific heat values.

6. The system of claim 1 wherein the ECU is further programmed to calculate a plurality of temperature values each corresponding to a temperature of the fluid at least one of a pump outlet of a pump or the outlet of the fuel cell stack based on a previously-determined temperature value at the at least one of the pump outlet or the outlet of the fuel cell stack and the model of the fuel cell circuit.

7. The system of claim 1 wherein the ECU is further programmed to calculate an amount of heat generated by the fuel cell stack and to control the actuator position further based on the amount of heat generated by the fuel cell stack.

* * * * *